(12) United States Patent
Sekiguchi et al.

(10) Patent No.: US 8,857,902 B2
(45) Date of Patent: Oct. 14, 2014

(54) FRONT VEHICLE BODY STRUCTURE

(71) Applicant: Honda Motor Co., Ltd., Tokyo (JP)

(72) Inventors: Tomohide Sekiguchi, Saitama (JP); Yoshinori Taguchi, Saitama (JP); Takanori Konishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/803,149

(22) Filed: Mar. 14, 2013

(65) Prior Publication Data
US 2013/0249245 A1 Sep. 26, 2013

(30) Foreign Application Priority Data

Mar. 26, 2012 (JP) ................... 2012-069492
Jul. 3, 2012 (JP) ................... 2012-149668

(51) Int. Cl.
B62D 25/08 (2006.01)
B62D 21/15 (2006.01)

(52) U.S. Cl.
CPC ............ *B62D 21/152* (2013.01); *B62D 25/082* (2013.01)
USPC ............... 296/193.09; 296/187.1; 296/187.09

(58) Field of Classification Search
CPC ..... B62D 25/082; B62D 21/152; B60R 19/24
USPC .............. 296/203.01, 203.02, 203.03, 29, 30, 296/193.06, 193.09, 205, 204, 187.02, 296/187.04, 187.09, 193.01; 280/781; 393/312.155; 293/117, 121, 131, 132, 293/133, 155
See application file for complete search history.

(56) References Cited

U.S. PATENT DOCUMENTS

| | | | |
|---|---|---|---|
| 6,957,846 B2 * | 10/2005 | Saeki | 296/187.1 |
| 7,341,299 B1 * | 3/2008 | Baccouche et al. | 296/30 |
| 7,469,956 B2 * | 12/2008 | Yasuhara et al. | 296/187.09 |
| 7,537,273 B2 * | 5/2009 | Lassl et al. | 296/187.12 |
| 7,810,878 B2 * | 10/2010 | Nakamura et al. | 296/203.02 |

(Continued)

FOREIGN PATENT DOCUMENTS

| | | |
|---|---|---|
| JP | 2003-034264 A | 2/2003 |
| JP | 2010-083448 A | 4/2010 |
| JP | 2010-083453 A | 4/2010 |

OTHER PUBLICATIONS

JP Office Action issued in corresponding Japanese patent application 2012-069492 drafted Jan. 10, 2014, with partial English translation thereof.

*Primary Examiner* — Pinel Romain
(74) *Attorney, Agent, or Firm* — Carrier Blackman & Associates, P.C.; William D. Blackman; Joseph P. Carrier

(57) ABSTRACT

On each of left and right sides of a vehicle body, a gusset is provided spaced in a rearward direction of a vehicle body from the distal end of a front side frame by a predetermined distance, a tension member extends between and interconnects the distal end of the front side frame and an outer end portion of the gusset so as to prevent the gusset from peeling off the front side frame, and a mounting plate spans between and interconnects the respective front ends of an inner bumper beam extension extending forward from the front end of the front side frame and an outer bumper beam extension extending forward from the front end of an upper member. A bumper beam is joined to the mounting plates on the left and right sides of the vehicle body.

14 Claims, 24 Drawing Sheets

(56) References Cited

U.S. PATENT DOCUMENTS

| | | | |
|---|---|---|---|
| 7,850,227 B2* | 12/2010 | Tamakoshi | 296/193.09 |
| 7,857,610 B2* | 12/2010 | Rossi et al. | 425/398 |
| 7,887,123 B2* | 2/2011 | Honji et al. | 296/187.09 |
| 8,002,338 B2* | 8/2011 | Yasuhara et al. | 296/203.02 |
| 8,029,033 B2* | 10/2011 | Hama et al. | 293/102 |
| 8,152,211 B2* | 4/2012 | Klimek | 293/102 |
| 8,496,287 B2* | 7/2013 | Matsuura et al. | 296/187.09 |
| 2011/0101732 A1* | 5/2011 | Baccouche et al. | 296/187.09 |
| 2012/0007373 A1* | 1/2012 | Boettcher et al. | 293/132 |
| 2012/0248819 A1* | 10/2012 | Okamura et al. | 296/187.1 |
| 2012/0248820 A1* | 10/2012 | Yasui et al. | 296/187.09 |
| 2012/0313398 A1* | 12/2012 | Shin et al. | 296/187.1 |
| 2013/0119704 A1* | 5/2013 | Amano et al. | 296/187.1 |

* cited by examiner (COMPARATIVE, CONVENTIONAL EXAMPLE)

(EMBODIMENT OF THE PRESENT INVENTION)

FRONT VEHICLE BODY STRUCTURE

FIELD OF THE INVENTION

The present invention relates to a front vehicle body structure which includes left and right front side frames extending in a front-rear direction of the vehicle body, and left and right gussets disposed extending laterally outward (i.e., outward in a vehicle width direction) of the corresponding front side frames for transmitting a frontal collision load to the front side frames, and which also includes left and right bumper beam extensions extending forward toward the front of the vehicle body from the respective front ends of the left and right front side frames and from left and right upper members.

BACKGROUND OF THE INVENTION

In the conventionally-known front vehicle body structures, a front side frame extends in a front-rear direction of the vehicle body, a lower member is disposed laterally outward (i.e., outward in a vehicle width direction) of the front side frame and extending substantially parallel to the front side frame as viewed in plan, an inner bumper beam extension is disposed at the distal end of the front side frame, an outer bumper beam extension is disposed at the distal end of the lower member, and a bumper beam extends in the vehicle width direction and connected to the respective distal or front ends of inner and outer bumper beam extensions.

An example of the front vehicle body structures is disclosed in Japanese Patent Application Laid-open Publication No. 2010-83448 (hereinafter referred to as "patent literature 1"), according to which, even when there has occurred a narrow offset collision where a frontal collision load (i.e., impact load applied from the front of the vehicle) acts on a narrow range of a laterally outer end portion (i.e., outer end portion in the vehicle width direction) of the vehicle.

However, the front vehicle body structure disclosed in patent literature 1 includes no means for positively transmitting a frontal collision load, acting on the outer bumper beam extension and lower member, for example from the lower member to the front side frame. Thus, when a narrow offset collision has occurred, the frontal collision load would be received by members disposed laterally outward of the side frame, and thus, an impact absorbing capability would be considerably limited.

Further, in the front vehicle body structure disclosed in patent literature 1, the outer bumper beam extension has a smaller length than the inner bumper beam extension. When an offset collision has occurred within a range including the front side frame, for example, the outer and inner bumper beam extensions can take part in absorption of a frontal collision load. However, when a narrow offset collision has occurred only within a narrow range laterally outward of the front side frame, it would be difficult for the inner bumper beam extension to take part in absorption of a frontal collision load. Therefore, it is preferable that the outer bumper beam extension is constructed to have an increased impact absorbing capability.

Further, in the front vehicle body structure disclosed in patent literature 1, the outer and inner bumper beam extensions are provided separately with a poor interconnection therebetween. Thus, when a frontal collision acts on the outer bumper beam extension, it would be difficult for the inner bumper beam extension to take part in impact absorption. Furthermore, in the front vehicle body structure disclosed in patent literature 1, a distal end portion of the front side frame has a width increasing toward the front of the vehicle body as viewed in plan, and thus, a space between the front side frame and the lower member is so small that it would be difficult to mount other component parts within the space. Besides, a mold for forming the front side frame has to have an increased size, and a yield rate of the front side frame would decrease.

Further, Japanese Patent Application Laid-open Publication No. 2010-83453 (hereinafter referred to as "patent literature 2"), for example, discloses a front vehicle body structure which includes inner bumper beam extensions extending forward toward the front of the vehicle body from the respective front ends of the left and right front side frames and outer bumper beam extensions extending forward toward the front of the vehicle body from the respective front ends of left and right upper members. More specifically, the front vehicle body structure disclosed in patent literature 2 includes: the left and right front side frames disposed on left and right sides of the vehicle body and extending in the front-rear direction of the vehicle body; left and right upper members disposed upward and laterally outward (i.e., outward in the vehicle width direction) of the left and right front side frames and extending obliquely forward and downward from the left and right upper front pillars; the left and right inner bumper beam extensions extending forward from the respective front ends of the left and right front side frames; the left and right outer bumper beam extensions extending forward from the respective front ends of the left and right upper members; and a bumper beam extending in the vehicle width direction between the left and right outer bumper beam extensions and joined with the left and right inner bumper beam extensions and the left and right outer bumper beam extensions.

When there has occurred a narrow offset collision where a frontal collision load acts on a narrow range of a laterally outer end portion (i.e., outer end portion in the vehicle width direction) of a front section (bumper beam) of the vehicle, the frontal collision load is transmitted from the bumper beam to the left and right inner and outer bumper beam extensions. These bumper beam extensions can absorb the impact by collapsing due to the frontal collision load.

Generally, during travel of a vehicle, various external force acts on the vehicle body depending on states of the travel. For example, depending on a posture of the traveling vehicle, twisting force may act on the left and right front side frames and the left and right upper members. In order to increase steering stability of the vehicle, it is required to increase rigidity, particularly rigidity against twisting force (i.e., twisting rigidity), of laterally outward end portions of a front section the vehicle body. However, increasing the rigidity of the laterally outer end portions of the front section of the vehicle body cannot secure sufficient impact absorbing performance at the time of occurrence of a narrow offset collision involving a frontal collision load.

SUMMARY OF THE INVENTION

In view of the foregoing prior art problems, it is an object of the present invention to provide an improved front vehicle body structure which, at the time of occurrence of an offset collision of a narrow abutment width, can achieve an increased capability for absorbing an impact of a frontal collision load, and which, in a case where a connection member, such as a gusset, is provided to increase the impact absorbing capability, can prevent the connection member from peeling off easily.

It is another object of the present invention to provide an improved front vehicle body structure which, at the time of occurrence of a light narrow offset collision involving a small frontal collision, allows a bumper beam extension, taking part in absorption of the frontal collision load, to have a sufficient impact absorbing stroke.

It is still another object of the present invention to provide an improved front vehicle body structure which, in a case where a plurality of bumper beam extensions, such as outer and inner bumper beam extensions, are provided, can enhance a connection between the bumper beam extensions.

It is still another object of the present invention to provide an improved front vehicle body structure which can facilitate manufacture of a component part that constitutes the front vehicle body structure but also achieve an increased yield rate of the component part.

It is still another object of the present invention to provide an improved technique which can increase steering stability of a vehicle while securing sufficient front-to-rear impact absorbing performance at the time of occurrence of a narrow offset collision.

In order to accomplish the above-mentioned objects, the present invention provides an improved front vehicle body structure, which comprises on each of left and right sides of the vehicle body: a front side frame extending in a front-rear direction of a vehicle body; a gusset disposed outward, in a vehicle width direction, of the front side frame, the gusset transmitting a frontal collision load to the front side frame when the frontal collision load has acted on a portion of the vehicle located outward, in the vehicle width direction, of the front side frame, the gusset being disposed spaced in a rearward direction of the vehicle body from the distal end of the front side frame by a predetermined distance; and a tension member extending between and interconnecting the distal end of the front side frame and an outer end portion of the gusset, the tension member preventing the gusset from peeling off the front side frame.

Many of vehicle collision experiments have heretofore been conducted assuming a frontal collision. Such vehicle collision experiments have identified that actual collision accidents involve, rather than a head-on collision, a so-called narrow offset collision where a frontal collision load acts on a portion of the vehicle located laterally outward of one of the left and right front side frames and greatly offset from the longitudinal centerline of the vehicle. In a head-on collision, an impact is absorbed by the entire front surface of the vehicle. But, in a narrow offset collision, a collision load does not act on the front side frame and thus collision energy cannot be absorbed, which would lead to a greater damage to the vehicle. Therefore, there has so far been a demand for designing a strength and an impact absorbing capability of a vehicle assuming a narrow offset collision.

Thus, according to the present invention, the gusset disposed laterally outward (i.e., outward in the vehicle width direction) of the front side frame and functioning to transmit a frontal collision load to the front side frame when the frontal collision load has acted on a portion of the vehicle located laterally outward of the front side frame. Energy of the frontal collision load can be absorbed by the gusset bending the front side frame after receiving the frontal collision load. As a result, the present invention can achieve an increased capability for absorbing an impact of the frontal collision load caused by the narrow offset collision.

Further, according to the present invention, the gusset is disposed spaced in the rearward direction of the vehicle body from the distal end of the front side frame by a predetermined distance, and the tension member extends between and interconnects the distal end of the front side frame and the outer end portion of the gusset for preventing the gusset from peeling off the front side frame. Thus, when a narrow offset collision has occurred, the present invention can prevent the gusset from peeling off the front side frame. As a result, the tension member can prevent the gusset from peeling off the front side frame against a frontal collision load having acted on a portion of the vehicle located laterally outward of the front side frame at the time of occurrence of the narrow offset collision, and impact energy of the frontal collision load can be absorbed by the gusset bending the front side frame.

Preferably, in the front vehicle body structure of the invention, the front side frame includes a gusset joint section having a high strength by having the gusset joined thereto and an engine mount section having a high strength for mounting thereon an engine at a position rearward of the gusset joint section. A bending point section of a low strength is provided between the gusset joint section and the engine mount section for allowing the front side frame to bend at the bending point section when a frontal collision load has acted on the front side frame. By the provision of the bending point section of a low strength, there is no need to add a particular shape, such as a recessed shape, a particular reinforcing member, etc. to the front side frame, and thus, the front side frame and hence the front vehicle body structure can be manufactured with ease and with an increased yield rate. Such an arrangement can also achieve a reduced weight of the vehicle body.

Preferably, in the front vehicle body structure of the invention, the gusset is a lower member connection member interconnecting the front side frame and a lower member disposed along the front side frame. As viewed in plan, the lower member connection member defines an L shape portion in conjunction with a front part of the front side frame, and the lower member connection member has a front wall located at generally the same position, in the front-rear direction of the vehicle body, as the distal end of the lower member. The front vehicle body structure further comprises an inner bumper beam extension provided at the distal end of the front side frame for absorbing a frontal collision load, and an outer bumper beam extension provided at the distal end of the lower member for absorbing a frontal collision load, the outer bumper beam extension having a greater length than the inner bumper beam extension. Thus, when a light narrow offset collision involving a small collision load has occurred, the outer bumper beam extension is allowed to have a sufficient impact absorbing stroke, which can suppress breakage of the lower member. As a result, the vehicle can be repaired by replacement of the outer bumper beam extension alone, which is very cost efficient.

Preferably, in the front vehicle body structure of the invention, the inner bumper beam extension and the outer bumper beam extension are joined together or integrated by being interconnected at their respective front ends via a reinforcing member. Thus, the inner bumper beam extension can buckle together with the outer bumper beam extension at the time of occurrence of a narrow offset collision. With such an arrangement, the present invention can achieve efficient absorption of an impact of a frontal collision load.

Preferably, in the front vehicle body structure of the invention, the tension member is in a form of a steel plate and constitutes a generally-trapezoid-shaped structure in conjunction with the lower member connection member and the front part of the front side frame, and a triangular hollow structure section is provided in front of the generally-trapezoid-shaped structure. At the time of occurrence of a narrow offset collision, the triangular hollow structure section can function as an impact absorbing area. Further, at the time of occurrence of a narrow offset collision with a frontal collision load acting on the lower member connection member, the tension member can keep the lower member connection member pulled in the forward direction of the vehicle body and thereby keep the lower member connection member connected to the distal end of the front side frame. Namely, the tension member can provide a sufficient tension action to the lower member connection member and thereby prevent peeling-off of the lower member connection member from the front side frame.

Preferably, in the front vehicle body structure of the present invention further comprises a bumper beam disposed in front of the front side frames on the left and right sides of the vehicle body and extending in the vehicle width direction beyond the front side frames, and the bumper beam is joined at its opposite outer end portions to the outer bumper beam extensions on the left and right sides of the vehicle body structure. Thus, when a narrow offset collision has occurred, a frontal collision load can start being transmitted to the front side frame even at an initial stage of the collision, as a result of which the present invention can achieve an increased capability for absorbing an impact of the frontal collision load caused by the narrow offset collision.

Preferably, in the front vehicle body structure of the invention, the tension member functions also as a mounting plate member for mounting the inner and outer bumper extensions. Such an arrangement can simplify the construction of a front vehicle body section and reduce the number of necessary component parts of the front vehicle body section.

Preferably, in the front vehicle body structure of the invention, the lower member connection member has a front wall extension provided on the front wall of the lower member connection member and extending outward in the vehicle width direction, and the front wall extension is sandwiched between the tension member and the distal end of the lower member. At the time of occurrence of a narrow offset collision with a frontal collision load acting on the lower member connection member, the present invention can increase the tension action that keeps the lower member connection member pulled in the forward direction of the vehicle body and thereby keeps the lower member connected to the distal end of the front side frame against the frontal collision load.

Preferably, in the front vehicle body structure of the present invention, the front side frame extending in the front-rear direction of the vehicle body further comprises on each of the left and right sides of the vehicle body: an upper member disposed upward and outward, in the vehicle width direction, of the front side frame, the upper member extending obliquely forward and downward from a front pillar; an inner bumper beam extending forward from the front end of the front side frame; an outer bumper beam extending forward from the front end of the upper member; a mounting plate spanning between the respective front ends of the inner and outer bumper beam extensions; and a bumper beam extending in the vehicle width direction to be joined to the mounting plates on the left and right sides of the vehicle body.

According to the present invention, the mounting plate (each of the mounting plates on the left and right sides of the vehicle body, i.e. left and right mounting plates) spans between and thereby interconnects the respective front ends of the inner and outer bumper beam extensions. With such an arrangement, the present invention can increase rigidity, particularly twisting rigidity, of the laterally outer end portions of the front section of the vehicle body, and thereby increase the steering stability of the vehicle. Further, the bumper beam is joined, via the left and right mounting plates, to the front ends of the left inner and outer bumper beam extensions and to the front ends of the right inner and outer bumper beam extensions. Thus, at the time of occurrence of a narrow offset collision where a frontal collision load (i.e., impact load applied from the front of the vehicle) acts on a narrow range of an outer end portion, in the vehicle width direction, of a front section of the vehicle, the present invention can prevent the frontal collision load from adversely influencing the front-to-rear impact absorbing performance of the inner and outer bumper beam extensions. As a result, the present invention can achieve an increased steering stability of the vehicle while securing a sufficient front-to-rear impact absorbing performance against the narrow offset collision.

Further, preferably, in the front vehicle body structure of the present invention, each of the left and right mounting plates comprises at least a pair of front and rear reinforcing members joined together superposed on each other in the front-rear direction of the vehicle body, and the front and rear reinforcing members of each of the left and right mounting plates have upper flanges projecting from respective upper edges thereof in opposite front-rear directions (i.e., away from each other in the front-rear direction) of the vehicle body and lower flanges projecting from respective lower edges thereof in the opposite front-rear directions of the vehicle body. By the front and rear reinforcing members being joined together superposed on each other in the front-rear direction of the vehicle body and by the flanges projecting in the opposite front-rear directions from the upper and lower edges of the front and rear reinforcing members, the present invention can even further increase rigidity, particularly twisting rigidity, of the laterally outward end portions of the front section of the vehicle body.

Further, preferably, in the front vehicle body structure of the present invention, each of the left and right mounting plates comprises at least a pair of front and rear reinforcing members joined together superposed on each other in the front-rear direction of the vehicle body, the front reinforcing member of each of the left and right mounting plates having a locking claw projecting forward therefrom, and the bumper beam has left and right openings engageable with the locking claws of the left and right mounting plates. Thus, at the time of assembly of the vehicle, the bumper beam can be temporarily joined to the left and right mounting plates, and it is possible to eliminate a need for keeping on holding the bumper beam during mounting of the bumper beam and thereby facilitate the assembly work.

Furthermore, preferably, in the front vehicle body structure of the present invention, the bumper beam has left and right bolt mounting sections located more inwardly, in the vehicle width direction, than the left and right inner bumper beam extensions for fastening thereto left and right eyebolts, the left and right bolt mounting sections are sections to be towed via the left and right eyebolts. Namely, the left and right bolt mounting sections are provided more inwardly than the high-rigidity left and right mounting plates. When the vehicle is towed with the eyebolts fastened to the bolt mounting sections, reactive force produced by towing of the vehicle would act on the bumper beam as a load. The load having acted on the bumper beam is transmitted via the mounting plates to the inner and outer bumper beam extensions. Because the mounting plates have a high rigidity, the towing load can be dispersed to a greater range, and thus, the present invention can minimize deformation of the bumper beam etc. during the towing.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

As shown in FIGS. 1 to 4, an embodiment of a front vehicle body structure of the present invention is constructed to behave advantageously at against a narrow offset collision of the vehicle by including, on each of left and right sides thereof, a front side frame 15, a lower member 22; a gusset (lower member connection member) 31, an inner bumper beam extension (hereinafter sometimes referred to also as "inner extension") 24, an outer bumper beam extension (hereinafter sometimes referred to also as "outer extension") 25, a tension member (mounting plate member) 32 and a vertically-oriented reinforcing member 44 on each of left and right sides of the vehicle body.

Figure 16A:
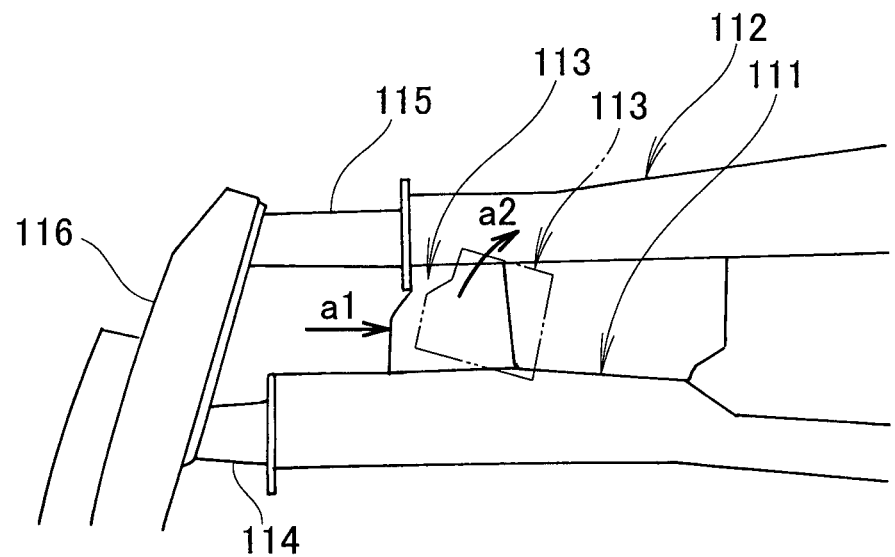
FIGS. 16A and 16B are views showing a comparative conventional example of a front vehicle body structure.
Figure 16B:
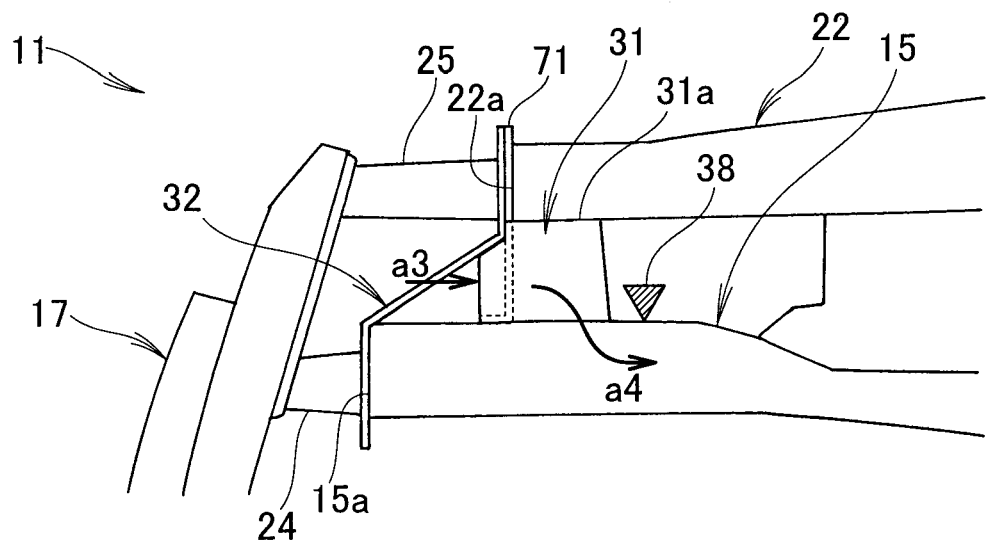

In the embodiment of the front vehicle body structure, the tension member 32 extends between and interconnects the distal end 15a of the front side frame 15 and the gusset (lower member connection member) 31 so that, at the time of occurrence of a narrow offset collision, it can transmit a load from the gusset 31 to the front side frame 15 to absorb impact energy (see FIG. 16B). Further, the outer bumper beam extension 25 has a greater length than the inner bumper beam extension 24, so as to appropriately deal with a light offset collision involving a small frontal collision load (see FIG. 18A).

Figure 12:
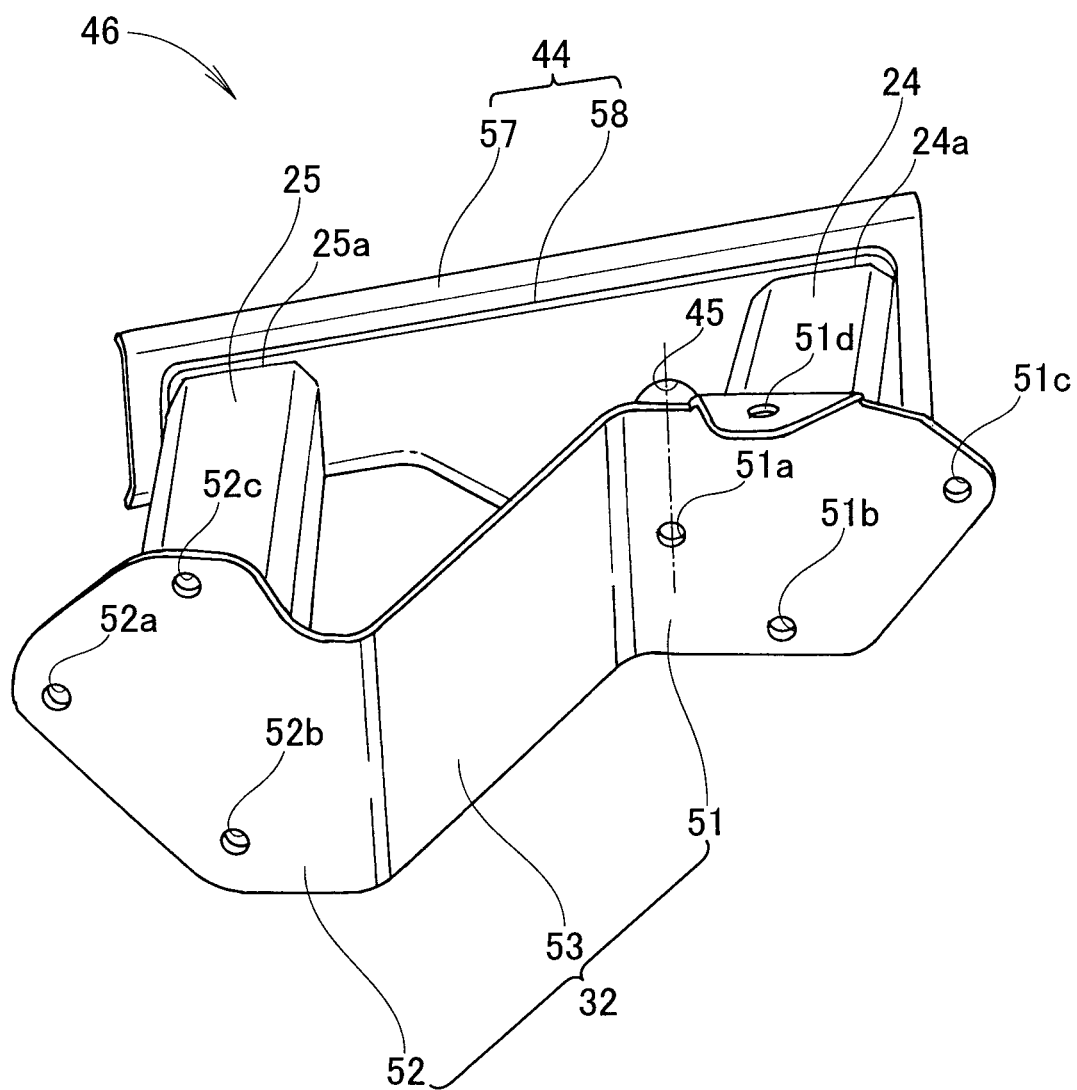
FIG. 12 is a perspective view of a bumper extension assembly provided in the embodiment the front vehicle body structure of FIG. 1.
Figure 13:
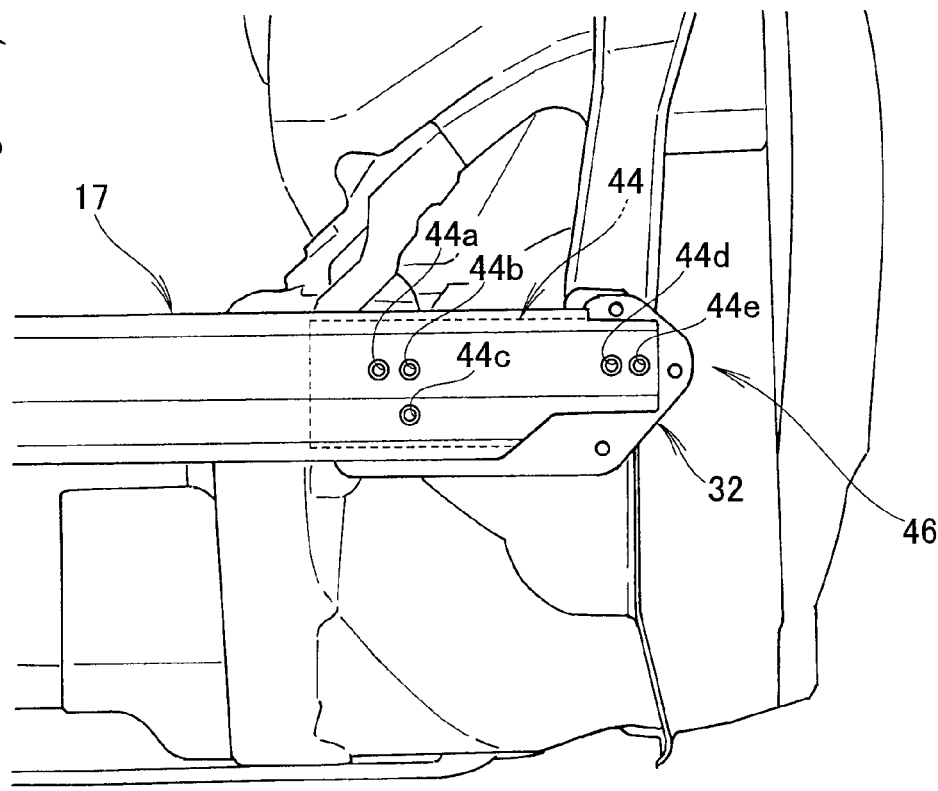
FIG. 13 is a perspective view showing a manner in which a bumper beam is mounted in the embodiment of the front vehicle body structure of FIG. 1.

Further, the inner bumper beam extension 24 and the outer bumper beam extension 25 are joined together or integrated by being interconnected at their respective front ends 24a and 25a via the reinforcing member 44 in such a manner that the inner bumper beam extension 24 can buckle together with the outer bumper beam extension 25 at the time of occurrence of a narrow offset collision (see FIG. 12). Also, the reinforcing member 44 is constructed of a pair of front and rear steel plates, each of a generally U cross-sectional shape, joined together at their base portions (or bottom surfaces), so that the inner bumper beam extension 24 can buckle even more reliably at the time of occurrence of a narrow offset collision.

As further shown in FIGS. 1 to 4, the vehicle 10, which is for example a four-door passenger vehicle, includes, inside a vehicle body 11, an engine room 12 and a passenger compartment 13 located immediately rearward of or behind the engine room 12. The vehicle body 11 is in the form of a monocoque body and constructed horizontally (left-right) symmetrically with respect to the longitudinal centerline CL extending in the front-rear direction of the vehicle centrally through the width of the vehicle 10. Thus, it should be appreciated that some of the following descriptions directed to only one of left and right side sections of the vehicle body also applies to the other of the left and right side sections of the front vehicle body structure.

The vehicle body 11 includes, in a front section of the vehicle body 11, the left and right front side frames 15 disposed on the left and right sides of the vehicle body 11 and extending in the front-rear direction of the vehicle body 11; a bulkhead 16 that is a frame of a generally rectangular shape disposed laterally inward of respective front end portions of the left and right front side frames 15; a bumper beam 17 disposed in front of the left and right front side frames 15 and extending in a vehicle width direction beyond an outer end of each of the front side frames 15; a lower dashboard panel 18 partitioning the vehicle body 11 in the front-rear direction; left and right front pillars 19 disposed laterally outward of the lower dashboard panel 18; left and right upper members 21 disposed upward of the left and right front side frames 15 and extending in the forward direction of the vehicle body from the left and right front pillars 19; and the left and right lower members 22 extending obliquely forward and downward from the left and right upper members 21.

The engine room 12 and the passenger compartment 13 are partitioned from each other by the lower dashboard panel 18, and the lower dashboard panel 18 is joined at its left and right ends to the left and right front pillars 19, respectively.

Each of the left and right upper members 21 includes a horizontal section 21b extending substantially horizontally forward from the corresponding left or right front pillar 19, and a downward slant section 21c slanting forward and downward from the distal end 21a of the horizontal section 21b.

Figure 8:
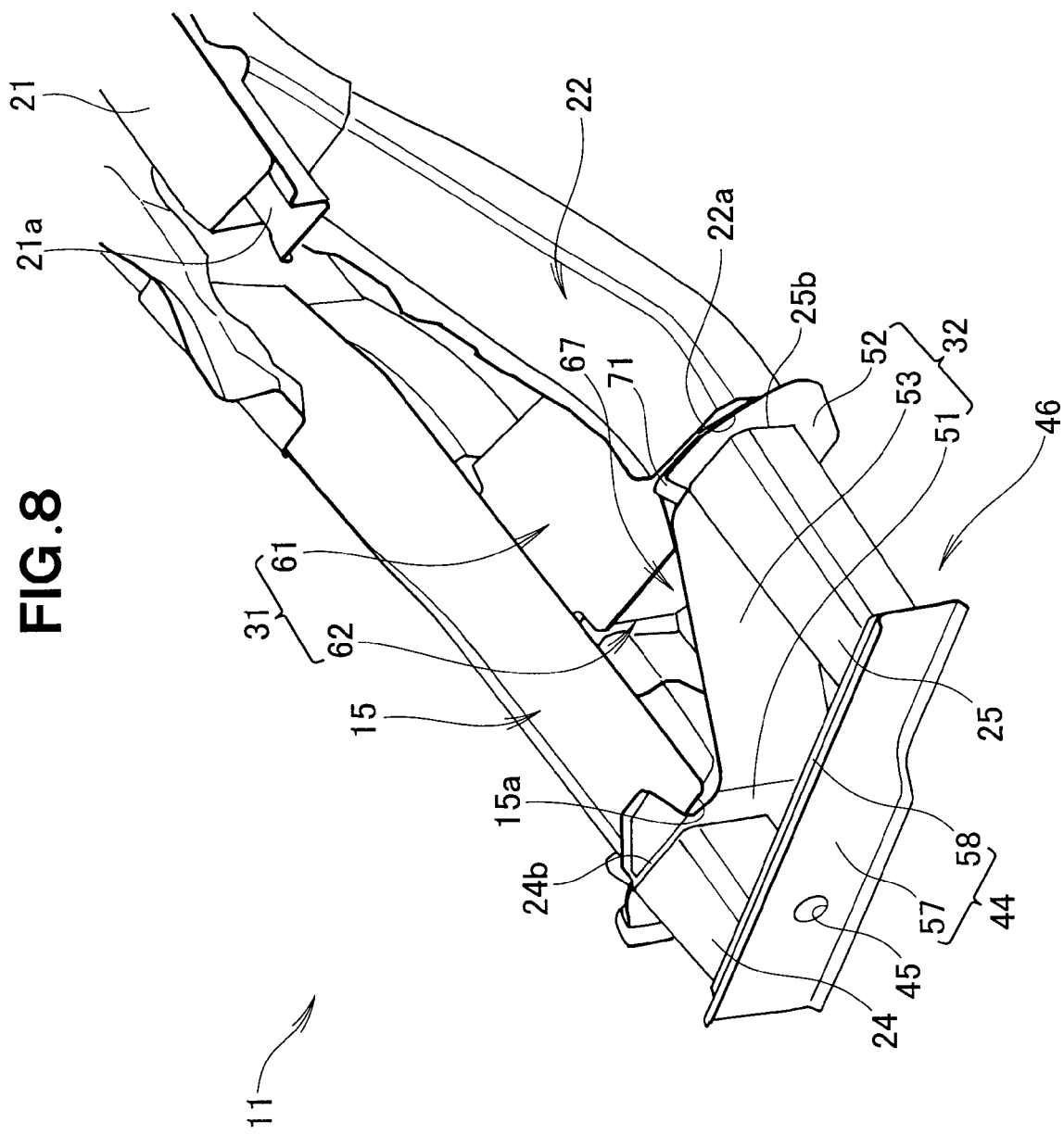
FIG. 8 is a perspective view showing a primary section of the embodiment of the front vehicle body structure of FIG. 1.

The inner bumper beam extension 24 that absorbs a frontal collision load is provided at the distal end 15a of each of the left and right front side frames 15 (see FIG. 8). The outer bumper beam extension 25 that absorbs a frontal collision load is provided at the distal end 22a of each of the left and right lower members 22 (see FIG. 8). The outer bumper beam extension 25 has a greater length than the inner bumper beam extension 24.

The bumper beam 17 extends in the vehicle width direction laterally beyond the respective distal ends 15a of the left and right front side frames 15, and the left and right outer bumper beam extensions 25 are joined to opposite end portions 17a of the bumper beam 17.

The left and right upper ends 16a of the bulkhead 16 and the distal ends 21a of the left and right upper members 21 are interconnected via left and right bulkhead support members 26, respectively. Namely, the left and right bulkhead support members 26, supporting the bulkhead 16, extend from the distal ends 21a of the horizontal section 21b to the left and right upper ends 16a of the bulkhead 16. The left and right lower ends of the bulkhead 16 are supported by the distal ends of the left and right front side frames 15.

Near the lower dashboard panel 18, left and right damper housings 27 are provided between the left front side frame 15 and the left upper member 21 and between the right front side frame 15 and the right upper member 21. The left and right damper housings 27 are interconnected via a strut power bar 28 to increase the rigidity of the vehicle body.

Figure 4:
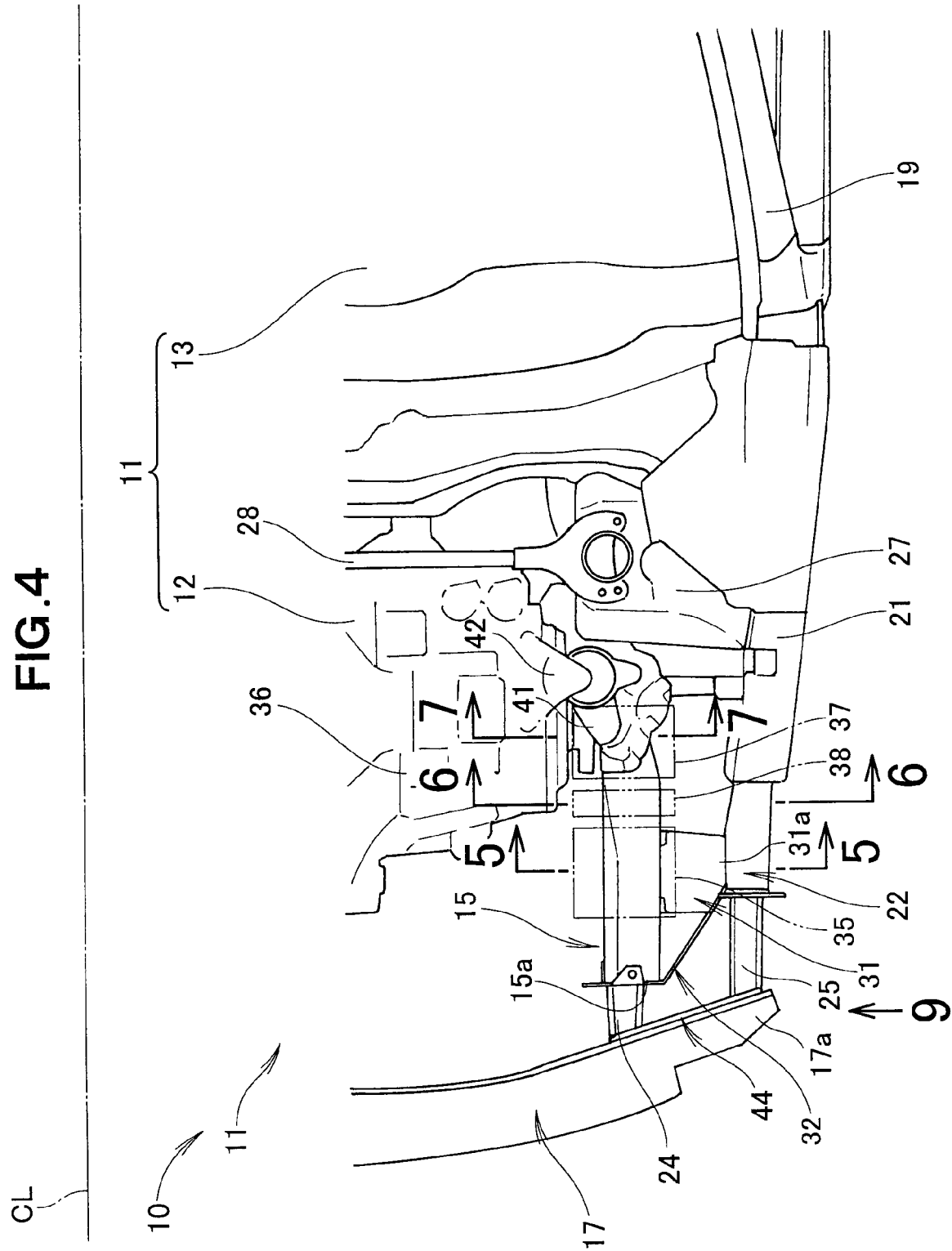
FIG. 4 is a plan view showing the left side section of the embodiment of the front vehicle body structure of FIG. 1.
Figure 5:
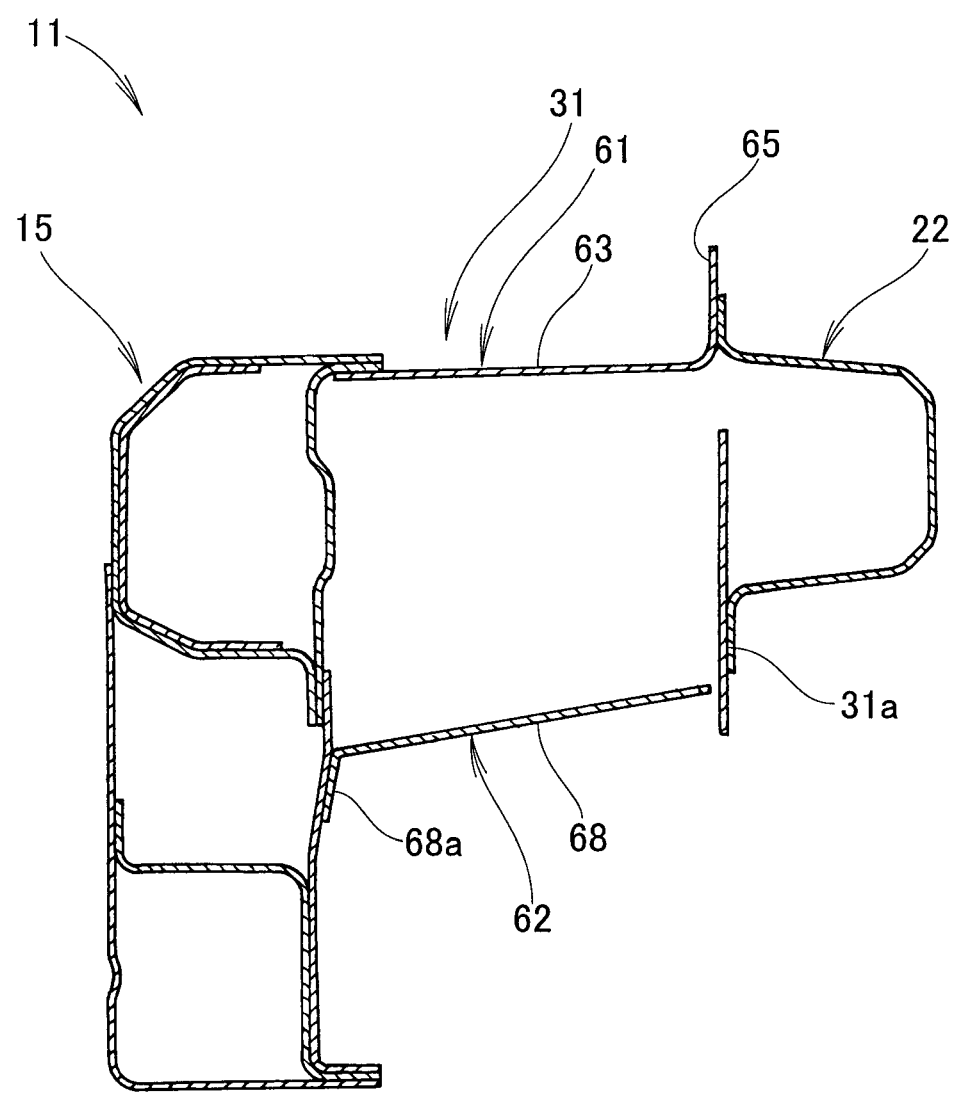
FIG. 5 is a sectional view taken along line 5-5 of FIG. 4.

As shown in FIG. 4, the gusset 31 is disposed laterally outward of each of the front side frames 15, and, when a frontal collision load has acted on a portion of the vehicle located laterally outward of the front side frame 15, the gusset 31 functions to transmit the frontal collision load to the front side frame 15.

More specifically, the gusset 31 is a lower member connection member interconnecting the front side frame 15 and the lower member 22 disposed along the front side frame 15. The gusset 31 is disposed spaced in the rearward direction of the vehicle body from the distal end 15a of the front side frame 15 by a predetermined distance as viewed in plan, and the tension member 32 extends or spans between and interconnects the distal end 15a of the front side frame 15 and an outer end portion 31a of the gusset 31 for preventing the gusset 31 from peeling off the front side frame 15. Hereinbelow, the gusset 31 will also be referred to as "lower member connection member 31" as necessary.

Further, each of the front side frames 15 includes a gusset joint section 35 having the gusset 31 joined thereto, an engine mount section 37 mounting thereon an engine 36 mounted thereon behind (i.e., at a position located rearward of) the gusset joint section 35, and a bending point section 38 set between the gusset joint section 35 and the engine mount section 37. The gusset joint section 35 has a high strength by having the gusset (lower member connection member) 31 jointed thereto.

Figure 7:
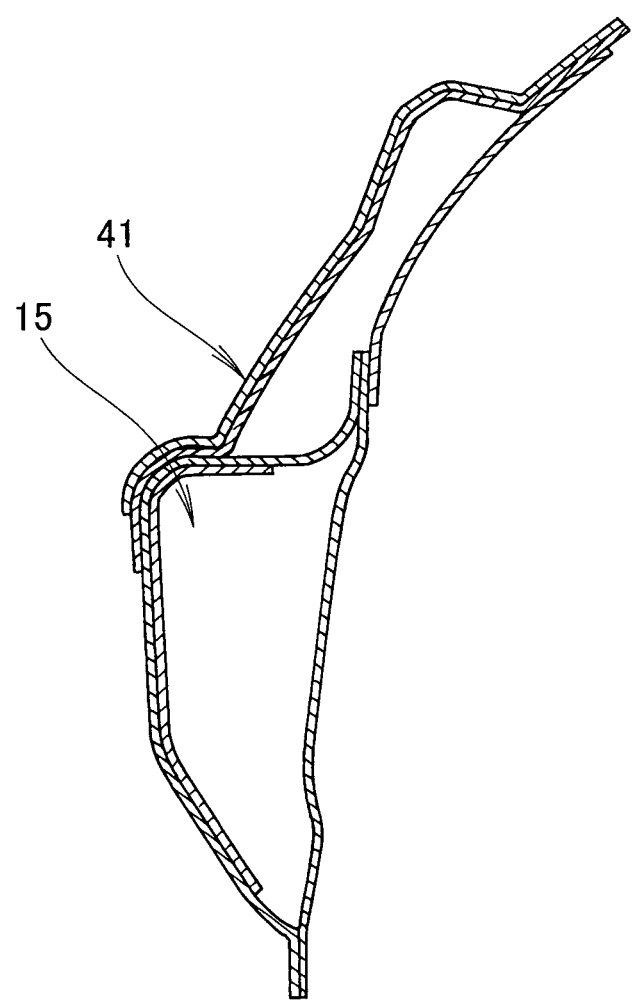
FIG. 7 is a sectional view taken along line 7-7 of FIG. 4.

The engine mount section 37 also has a high strength by having connected thereto an engine mounting bracket 41 mounting thereon the engine 36 and a fixation member 42 extending from the engine 36. A rubber member (not shown) for absorbing vibration is disposed between the engine mounting bracket 41 and the engine 36. Namely, the engine mount section 37 has a high strength by being constructed as an engine mounting bracket structure including the engine mounting bracket 41 and the fixation member 42 (see also FIG. 7).

Figure 6:
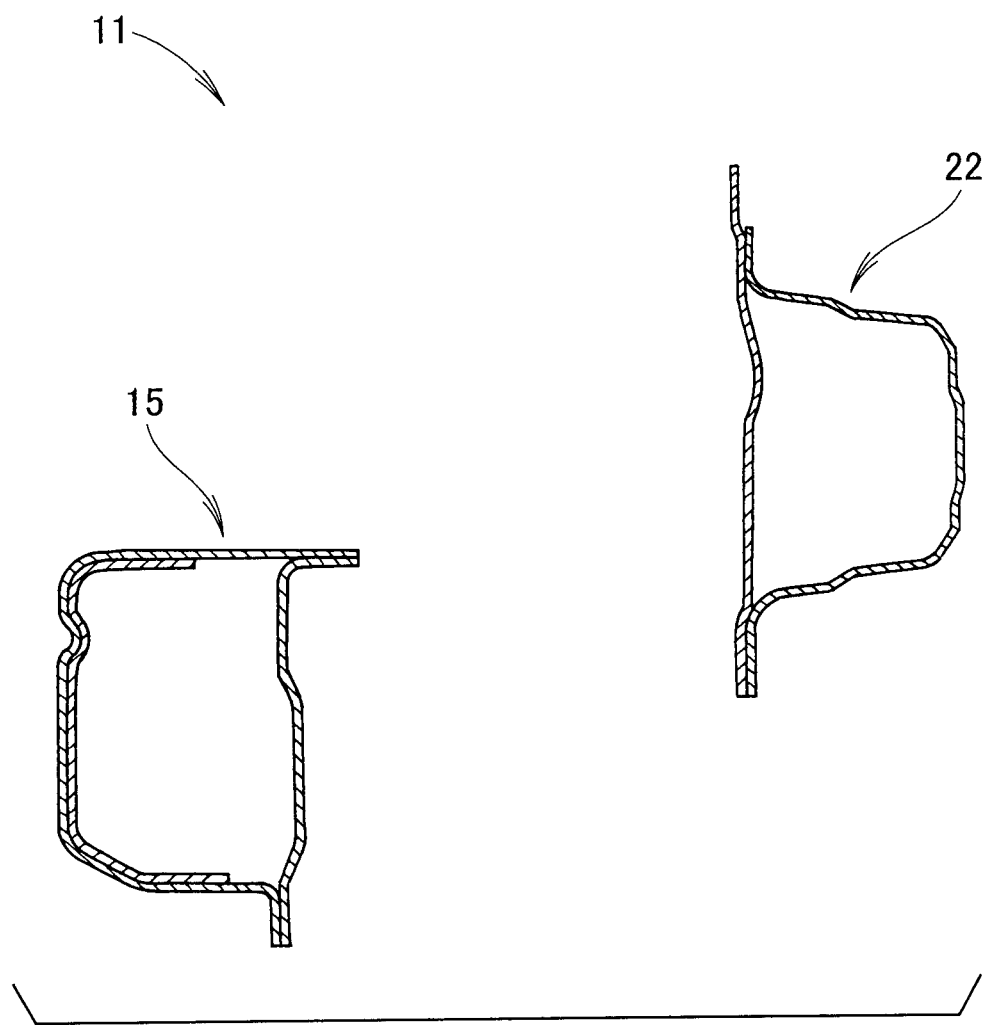
FIG. 6 is a sectional view taken along line 6-6 of FIG. 4.

When a frontal collision load has acted on the front side frame 15, the bending point section 38 allows the front side frame 15 to be bent. The bending point section 38 has a low strength because there is no member joined thereto around the front side frame 15 (see FIG. 6). Because the bending point section 38 is a low-strength section between the high-strength gusset joint section 35 and the high-strength engine mount section 37 of the front side frame 15, there is no need to add a particular shape, such as a recessed shape, a particular reinforcing member, etc. to the front side frame 15, and thus, the front side frame 15 and hence the front vehicle body structure can be manufactured or made with ease and with a reduced weight.

As shown in FIGS. 8 to 15, the inner and outer bumper beam extensions 24 and 25 are joined or integrated together by their respective front ends 24a and 25a being interconnected by the reinforcing member 44. The inner and outer bumper beam extensions 24 and 25 are also interconnected at their respective rear ends 24b and 25b by the tension member 32. Namely, the inner and outer bumper beam extensions 24 and 25, reinforcing member 44 and tension member 32 are constructed as an integrated unit, thereby providing a bumper beam extension assembly 46. The bumper beam extension assembly 46 is fastened, from the front of the vehicle body, to respective fastening sections 47 and 48 of the front side frame 15 and lower member 22.

The tension member 32 is in the form of a step-shaped plate and includes an inner mounting section 51 for mounting thereto the inner bumper beam extension 24, an outer mounting section 52 for mounting thereto the outer bumper beam extension 25, and a tension section 53 provided between the inner and outer mounting sections 51 and 52. Namely, the tension member (tension plate) 32 functions also as a plate for mounting the inner and outer bumper beam extensions 24 and 25.

The inner mounting section 51 of the tension member 32 is fastened at, for example four fastening portions 51a to 51d, to the distal end 15a of the front side frame 15. The outer mounting section 52 is fastened at, for example three fastening portions 52a to 52c, to the distal end 22a of the lower member 22.

By being formed integrally with the inner and outer mounting sections 51 and 52, the tension section 32 functions to keep pulling the lower member connection member 31 to the distal end 15a of the front side frame 15 when a frontal collision load acts on the lower member connection member 31 due to occurrence of a narrow offset collision.

The tension member 32, which is in the form of a steel plate, constitutes a structure 54 of a generally trapezoidal shape (generally-trapezoid-shaped structure 54) in conjunction with the lower member connection member 31 and a front part 15b of the front side frame 15, and a triangular hollow structure section 55 is formed in front of the generally-trapezoid-shaped structure 54. Thus, at the time of occurrence of a narrow offset collision, the triangular hollow structure section 55 can not only function as an impact absorbing area but also perform a tension function to provide a tension effect. The "tension function" here is a function of pulling the lower member connection member 31 in the forward direction of the vehicle body to thereby keep the lower member connection member 31 connected to the front side frame 15.

The reinforcing member 44 comprises a pair of the front and rear plates 57 and 58, each having a generally U cross-sectional shape, integrally joined together, so that the inner bumper beam extension 24 can also buckle at the time of occurrence of a narrow offset collision.

The reinforcing member 44 has bumper beam fastening portions 44a to 44e, i.e. two bumper beam fastening portions 44d and 44e adjacent to the outer bumper beam extension 25 and three bumper beam fastening portions 44a to and 44c adjacent to the inner bumper beam extension 24.

The reinforcing member 44 also has an opening 45 for fastening the fastening portion 51a of the tension member 32.

Figure 9:
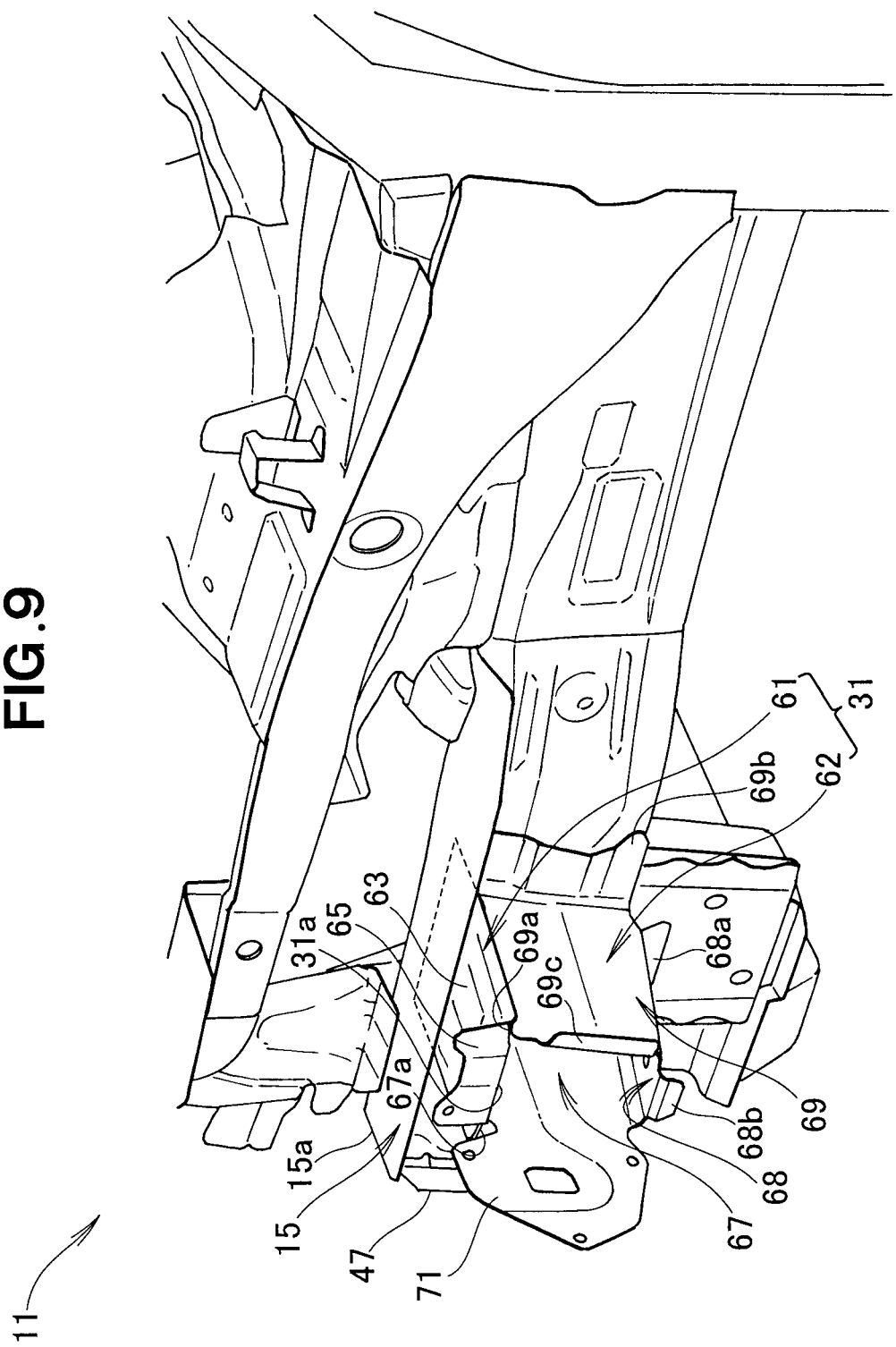
FIG. 9 is a rear perspective view of the embodiment of the front vehicle body structure as seen from laterally outside the front vehicle body structure.
Figure 10:
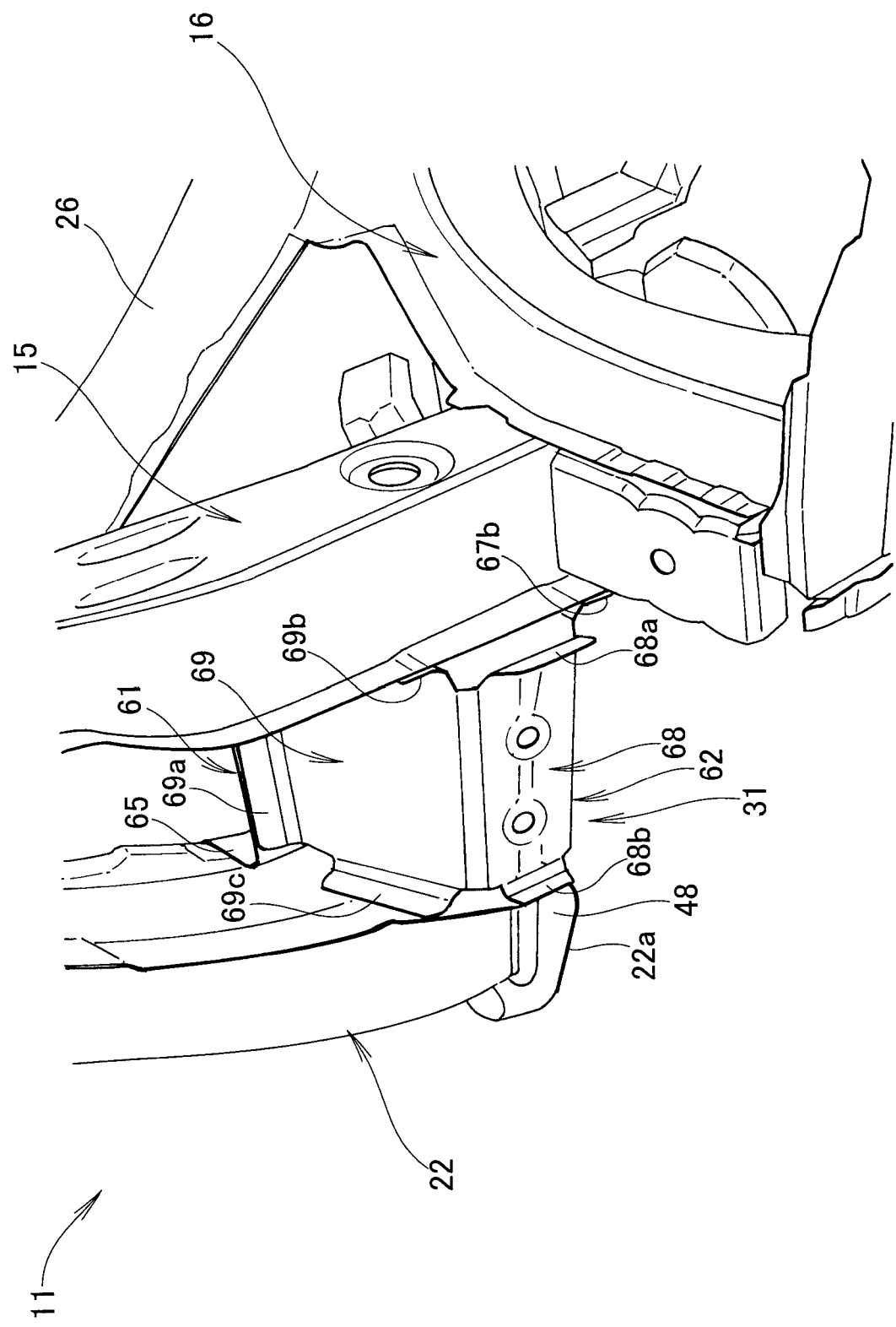
FIG. 10 is a bottom perspective view of the embodiment of the front vehicle body structure of FIG. 1.
Figure 11:
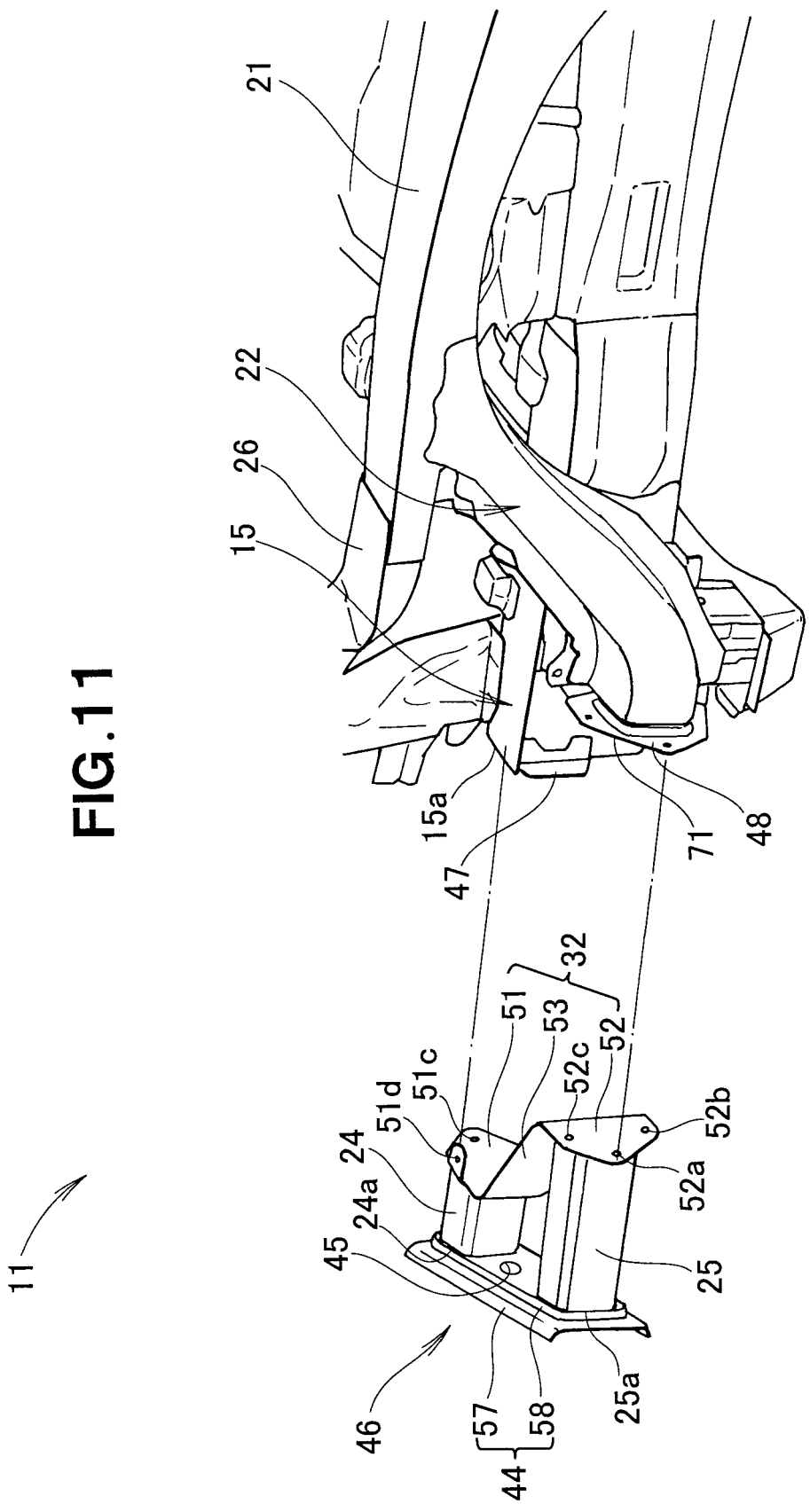
FIG. 11 is an exploded perspective view of the embodiment of the front vehicle body structure of FIG. 1.

Further, as shown in FIGS. 9 to 11, the gusset 31 comprises an upper member 61 of a flat plate shape and a lower member 62 of a U shape, and a closed section oriented in the vehicle width direction is defined with the upper and lower members 61 and 62. The upper member 61 has a body section 63 joined to the lower member, and an upper-side flange gusset 31 joined to the lower member 22. More specifically, the body section 63 is joined to the front side frame 15 and a front upper flange 67a and rear upper flange 69a of the lower member 62.

The lower member 62 has front, bottom and rear walls 67, 68 and 69 that together define a U shape of the lower member 62. The front wall 67 has a front wall extension 71 extending outward in the vehicle width direction, the front upper flange 67a joined to the upper member 61, and a front inner flange 67b joined to the front side frame 15.

The bottom wall 68 has an inner flange 68a joined to the front side frame 15, and an outer flange 68b joined to the lower member 22. The rear wall 69 has a rear upper flange 69a joined to the upper member 61, an inner flange 69b joined to the front side frame 15, and an outer flange 69c joined to the lower member 22.

Note that the outer end portion 31a of the gusset 31 corresponds in position to the upper-side flange 65 and the bottom wall outer flange 68b and rear wall outer flange 69c of the lower member 62.

Namely, the gusset 31 is joined at its four, i.e. upper and lower and front and rear, flanges to the outer side of the front side frame 15, and joined at its three, i.e. upper and lower and rear, flanges to the lower member 22. The front wall extension 71 is abutted against the fastening section 48 of the distal end 22a of the lower member 22 and the tension member 32 is superposed, from front, on the tension member 32, so that the tension member 32, front wall extension 71 and fastening section 48 are fastened together. In other words, the gusset (lower member connection member) 31 includes the front wall extension 71 formed on the front wall 67 and extending in the vehicle width direction, and the front wall extension 71 is sandwiched between the tension member 32 and the distal end 22a of the lower member 22.

Figure 15:
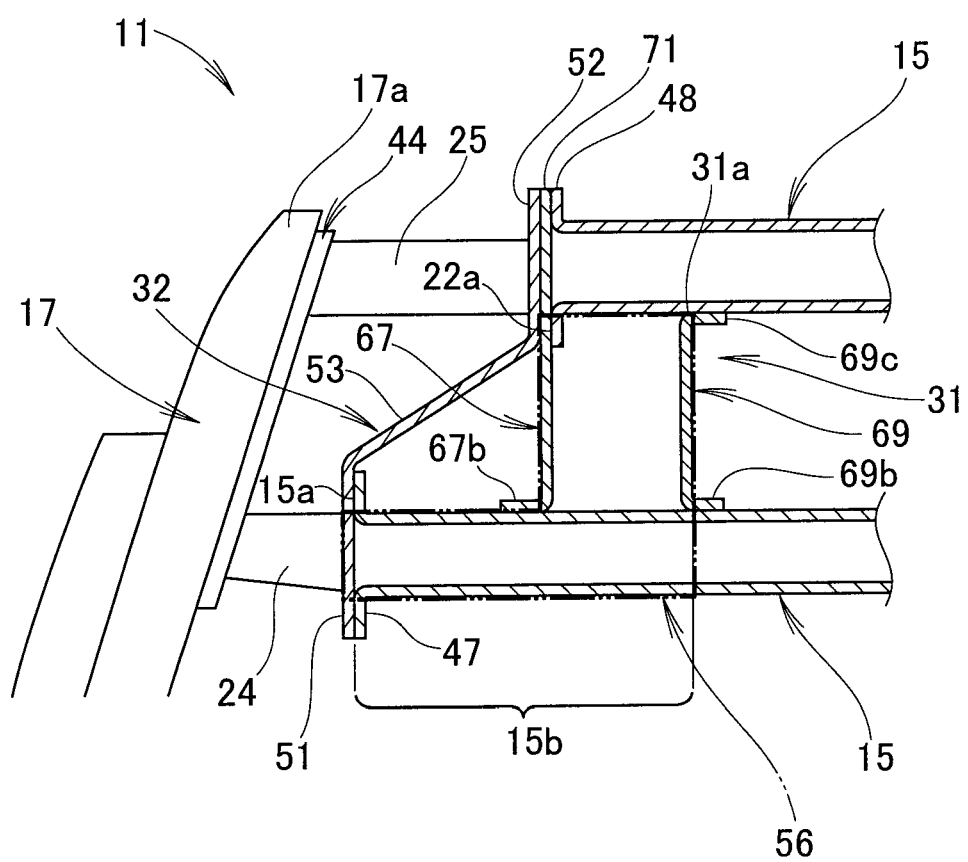
FIG. 15 is a view explanatory of an L shape portion provided in the embodiment of the front vehicle body structure of FIG. 1.

As shown in FIGS. 11 and 15, the gusset (lower member connection member) 31 is disposed to define an L shape in conjunction with the front part 15b of the front side frame 15 as viewed in plan, and the front wall of the lower member connection member 31 is located at generally the same position, in the front-rear direction of the vehicle body, as the distal end 22a of the lower member 22.

FIG. 16A shows a comparative, conventional example of a front vehicle body structure, in which a front side frame 111 extends in the front-rear direction of the vehicle body, a lower member 112 is disposed laterally outward (i.e., outward in a vehicle width direction) of the front side frame 111, a gusset (lower member connection member) 113 is disposed between the front side frame 111 and the lower member 112, an inner bumper beam extension 114 disposed at the distal end of the front side frame 111, an outer bumper beam extension 115 is disposed at the distal end of the lower member 112, and a bumper beam 116 joined to the front ends of the inner and outer bumper beam extensions 114 and 115.

In such a comparative, conventional example of the front vehicle body structure, no tension member is provided between the distal end of the front side frame 111 and an outer end portion of the lower member connection member 113. Therefore, when a narrow offset collision has occurred so that a frontal collision load acts on the lower member connection member 113 as indicated by arrow a1, the lower member connection member 113 may undesirably peel off the front side frame 111 as indicated by arrow a2. As a consequence, the frontal collision load at the time of occurrence of the narrow offset collision cannot be transmitted to the front side frame 111 in the comparative, conventional example of the front vehicle body structure.

FIG. 16B shows the above-described embodiment of the front vehicle body structure of the present invention, where the tension member (tension plate) 32 extends or spans between and interconnects the distal end 15a of the front side frame 15 and the outer end portion 31a of the lower member connection member 31. Therefore, when a narrow offset collision has occurred so that a frontal collision load acts on the lower member connection member 31 as indicated by arrow a3, the lower member connection member 31 can be kept pulled to the distal end 15a of the front side frame 15. In this way, it is possible to prevent the front side frame 15 from peeling off at the time of the narrow offset collision. As a result, the lower member connection member 31 can transmit the frontal collision load to the front side frame 15 as indicated by arrow a4, and the impact energy can be absorbed by the front side frame 15 being bent at the bending point section 38. In addition, as seen in FIG. 16B, in the depicted embodiment, the gusset 31 includes a front end portion which fits nestingly between the tension member 32 and the front side frame 15.

Further, FIGS. 17A to 17D show how the vehicle body 11 deforms over time at the time of occurrence of a narrow offset collision. Many of vehicle collision experiments have heretofore been conducted assuming a frontal collision. Such vehicle collision experiments have identified that actual collision accidents involve, rather than a head-on collision, a narrow offset collision where a frontal collision load acts on a portion of the vehicle located laterally outward of one of the left and right front side frames and greatly offset from the longitudinal centerline CL of the vehicle. In a head-on collision, an impact is absorbed by the entire front surface of the vehicle. However, in a narrow offset collision, a collision load does not act on the front side frame and thus collision energy cannot be absorbed, which would lead to a greater damage to the vehicle. Therefore, there has been a demand for setting a strength and an impact absorbing capability of a vehicle assuming a narrow offset collision.

Figure 17A:
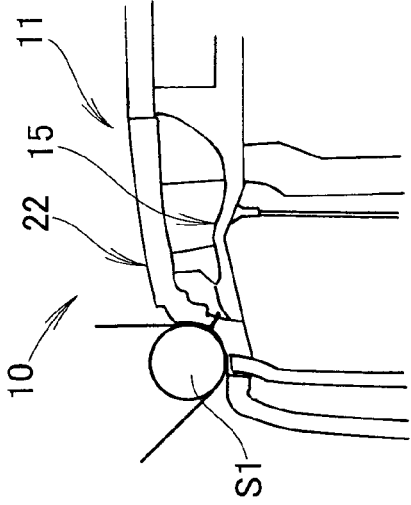
FIGS. 17A to 17D are views showing how the embodiment of the front vehicle body structure behaves at the time of a narrow offset collision.
Figure 17B:
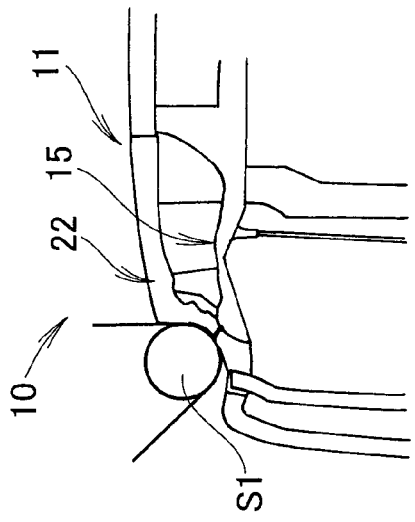

FIG. 17A shows a state of the vehicle body 11 at time point "0 ms" before occurrence of a narrow offset collision, at which time the vehicle body 11 has not yet been deformed. FIG. 17B shows the vehicle body 11 at time point "10 ms" after occurrence of a narrow offset collision with the vehicle 10 hitting an external obstacle (or another vehicle) S1, at which time a frontal collision load acts on a portion of the vehicle located laterally outward of the front side frame 15 as indicated by arrow b1. The frontal collision load having acted on the portion located laterally outward of the front side frame 15 is transmitted to the front side frame 15 via the tension member 32 and lower member connection member 31 as indicated by arrow b2.

Figure 17C:
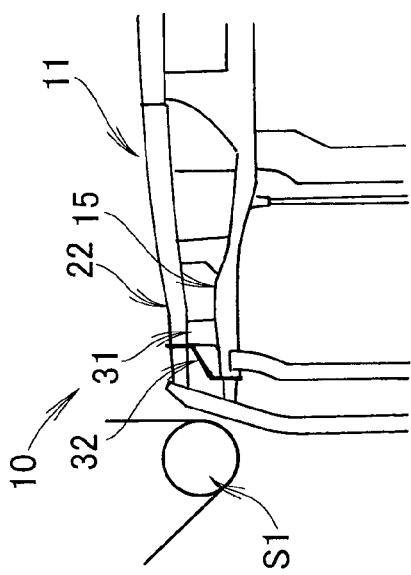

FIG. 17C shows the vehicle body 11 at time point "25 ms" after the occurrence of the narrow offset collision. At this time, the outer end portion 31a of the lower member connection member 31 is kept pulled to the distal end 15a of the front side frame 15 as shown in FIG. 16B so that an inner end portion of the lower member connection member 31 (i.e., gusset joint section 35 of the front side frame 15) can be prevented from peeling off from the front side frame 15 at the time of occurrence of the narrow offset collision. Further, at that time, the lower member connection member 31 is moved rearward so that the bending point section 38 can be bent to absorb impact energy.

Figure 17D:
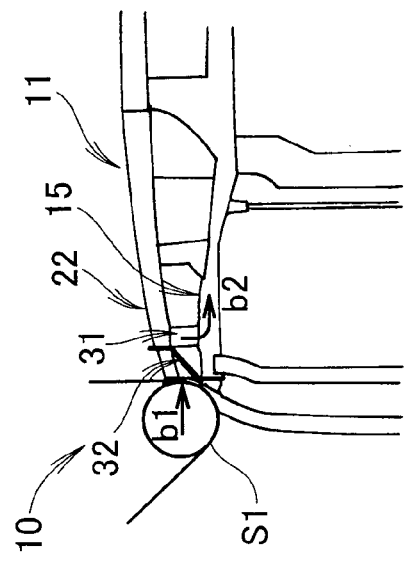

FIG. 17D shows the vehicle body 11 at time point "35 ms" after the occurrence of the narrow offset collision, at which time not only the collided portion of the vehicle has been moved further rearward but also the bending of the front side frame 15 has further progressed.

Figure 18A:
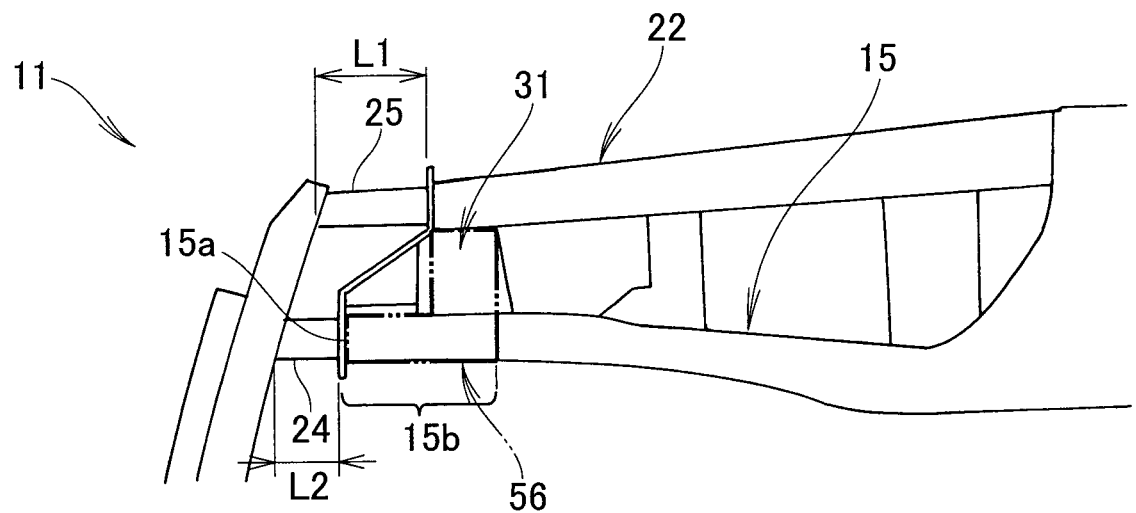
FIGS. 18A and 18B are views illustrating an impact absorbing area in the embodiment of the front vehicle body structure and illustrating how a frontal collision load is transmitted in the front vehicle body structure.

With the lower member connection member 31 disposed more rearward than the distal end 15a of the front side frame 15 to thereby define an L shape portion 56 in conjunction with the front part 15b of the front side frame 15 as viewed in plan, the length L1 of the outer bumper beam extension 25 is greater than the length L2 of the inner bumper beam extension 24 (L1>L2), as shown in FIG. 18A. Thus, when a light narrow offset collision involving a small collision load has occurred, the outer bumper beam extension 25 is allowed to have a sufficient impact absorbing stroke, which can suppress breakage of the lower member 22. Namely, the vehicle can be repaired by replacement of the outer bumper beam extension 25 alone, which is very cost efficient.

Figure 18B:
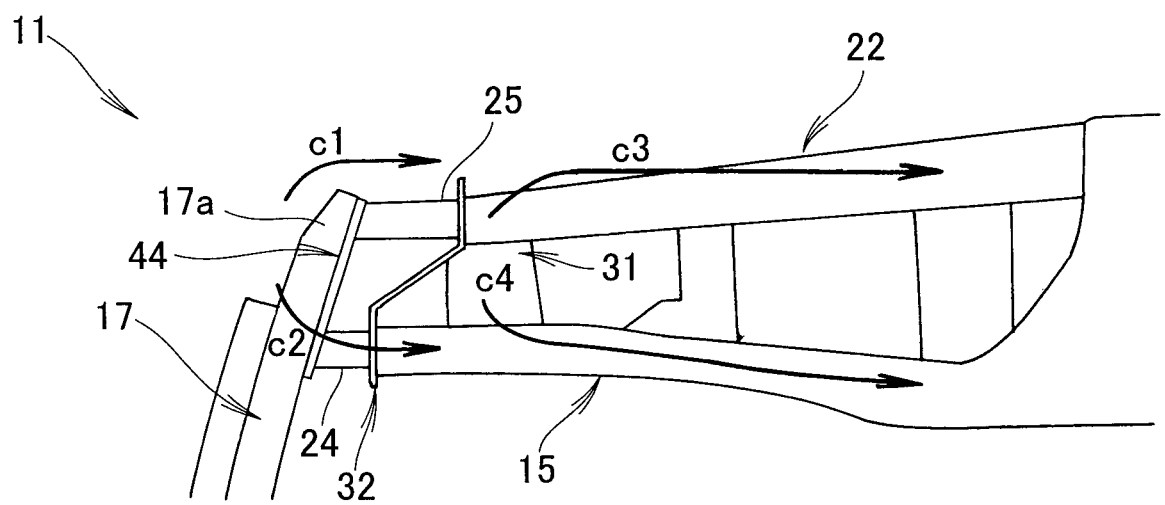

Further, as seen from FIG. 18B, the bumper beam 17 extending in the vehicle width direction has outward extensions at its opposite ends 17a (only one of which is shown in FIG. 18B). Further, the reinforcing member 44 extends or spans between the respective front ends 24a and 25a of the inner and outer bumper beam extensions 24 and 25. Thus, when a narrow offset collision has occurred, a frontal collision load input to a portion of the vehicle located laterally outward of the front side frame 15 as shown by arrow c1 can start being transmitted to the front side frame 15 as shown by arrow c2 at an initial stage of the collision. Namely, the input frontal collision load can start being dispersed to the front side frame 15 and the lower member 22 at the initial stage of the collision, as a result of which the instant embodiment can achieve an increased capability for absorbing an impact of the frontal collision load caused by the narrow offset collision.

Further, the load transmitted to the front side frame 15 can be transmitted to the lower member 22 via the lower member connection member 31 as indicated by arrow c3, and the load transmitted to the lower member 22 can be transmitted to the front side frame 15 via the lower member connection member 31 as indicated by arrow c4. Namely, the frontal collision load can be transmitted between the front side frame 15 and the lower member 22. As a result, at the time of occurrence of the narrow offset collision, smooth transmission of the frontal collision load can be achieved.

Figure 1:
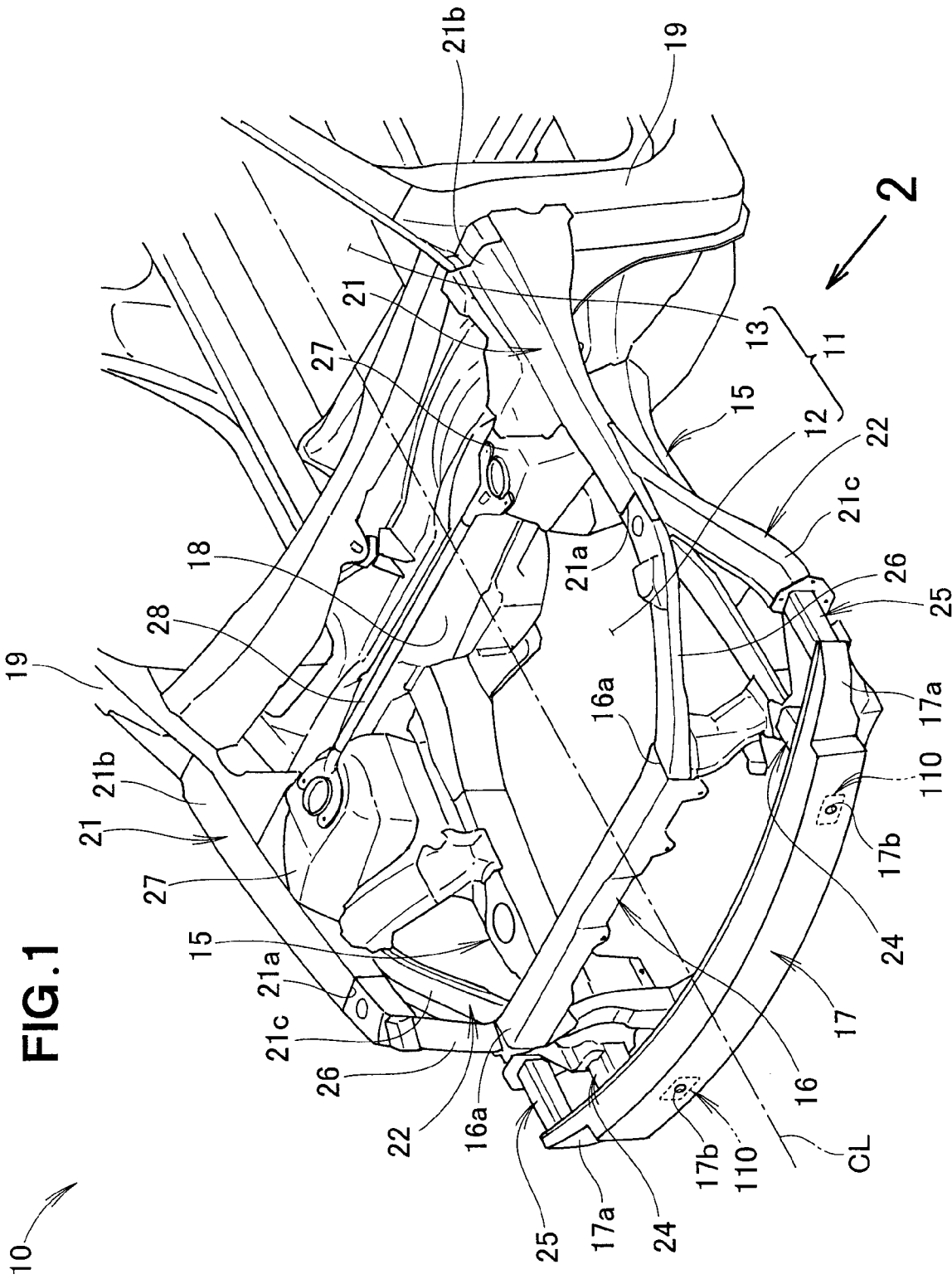
FIG. 1 is a perspective view showing an embodiment of a front vehicle body structure of the present invention.
Figure 2:
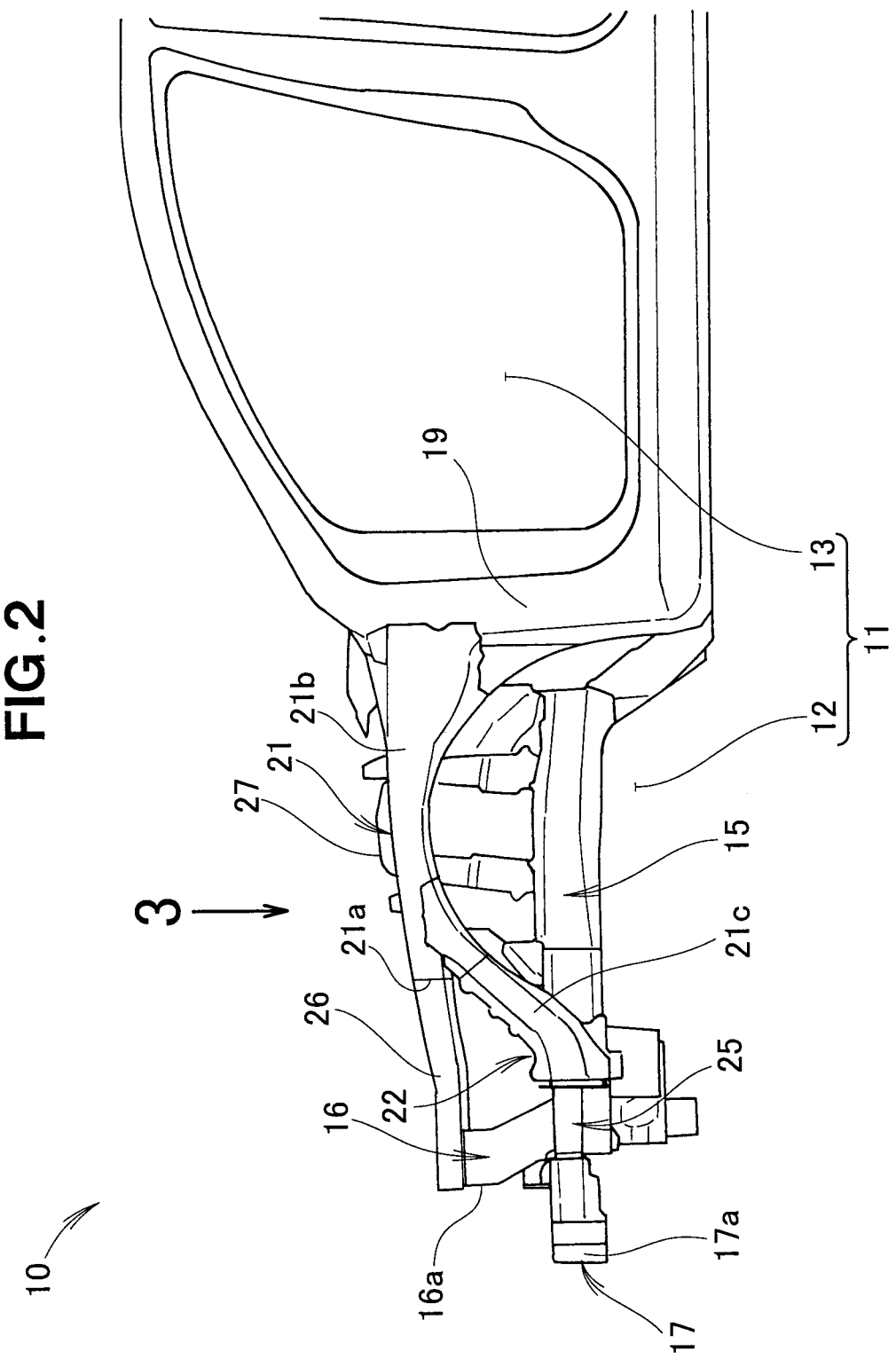
FIG. 2 is a side view of the embodiment of the front vehicle body structure taken in the direction of arrow 2 of FIG. 1.
Figure 3:
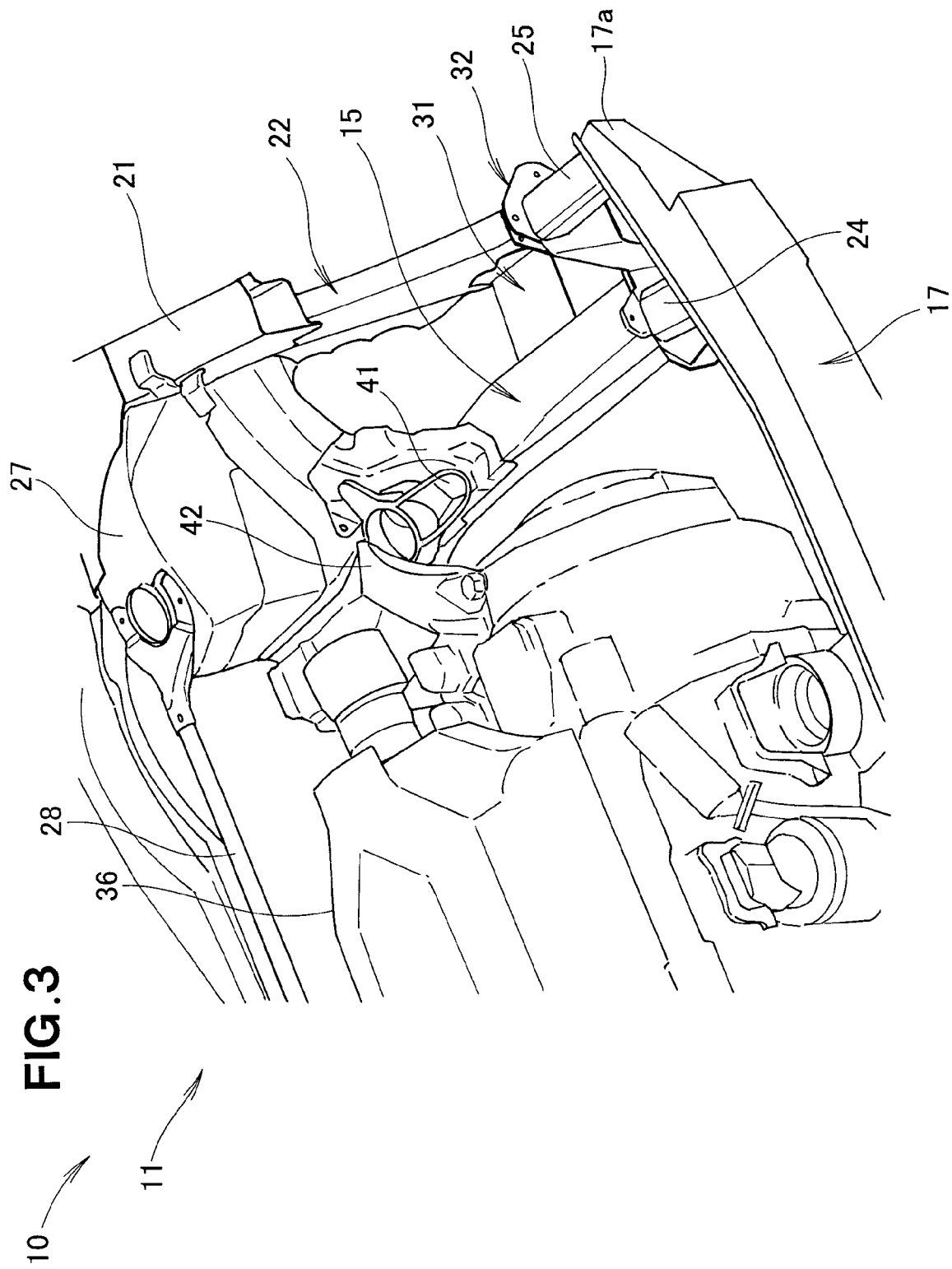
FIG. 3 is a perspective view showing a left side section of the embodiment of the front vehicle body structure of FIG. 1.
Figure 19:
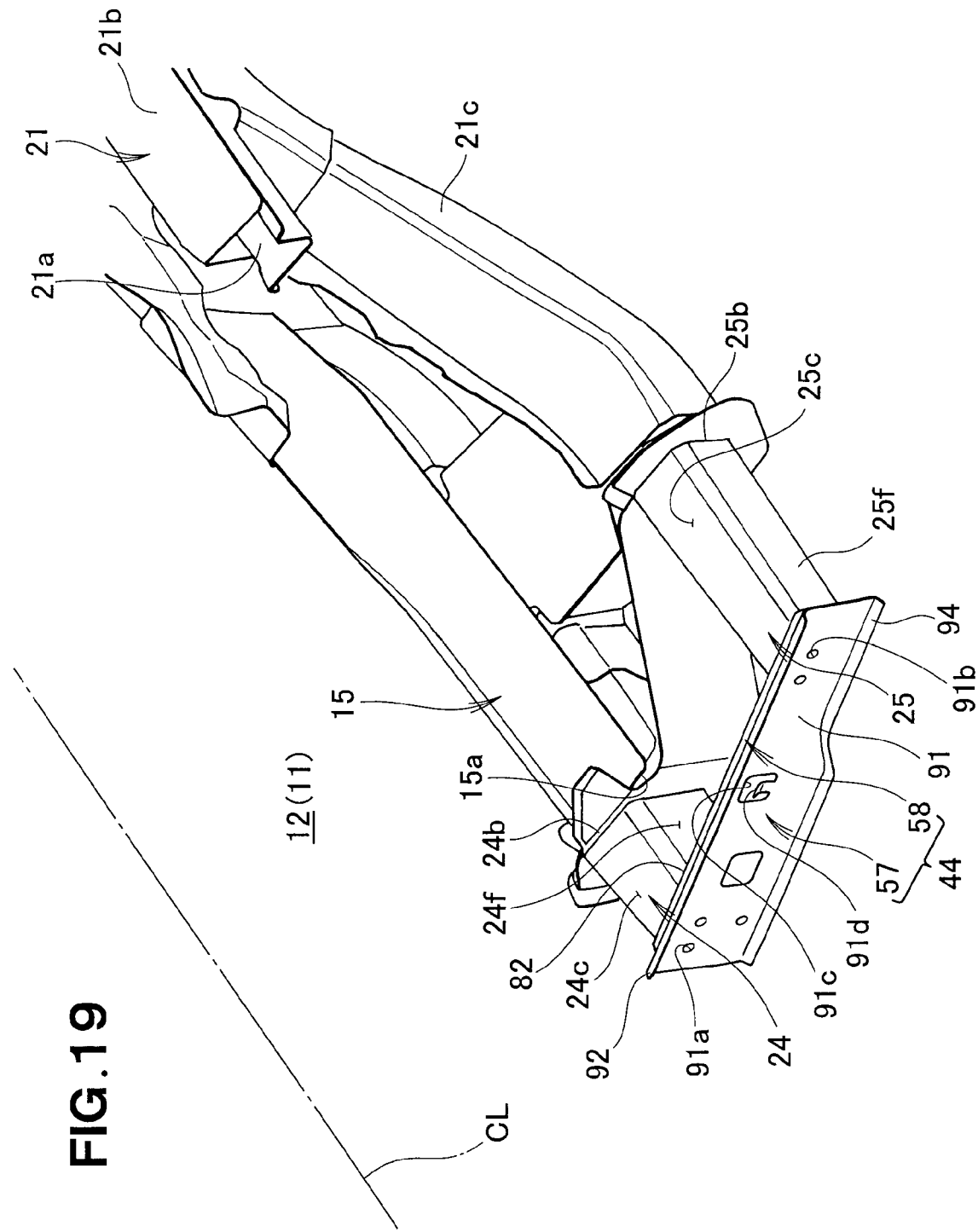
FIG. 19 is a perspective view showing a mounting plate, extensions and front side frame of FIG. 4.

As seen in FIGS. 1 and 19, the left and right inner extensions (i.e., left and right inner bumper beam extensions) 24 that absorb an impact at the time of a collision of the vehicle extend forward from the distal ends of the left and right front side frames 15, while the left and right outer extensions (i.e., left and right outer bumper beam extensions) 25 that absorb an impact at the time of a collision of the vehicle extend forward from the distal ends of the downward slant sections 21c of the left and right upper members 21. The left and right outer extensions 25 are disposed along and outwardly the left and right inner extensions 24. The bumper beam 17 extends in the vehicle width direction across the front ends of the left and right outer extensions 25.

The following detail, with reference to FIGS. 4 and 19, relationship between the inner and outer extensions 24 and 25 and the bumper beam 17. The left reinforcing member 44 is a vertically-oriented mounting plate member spanning between and interconnecting the distal ends of the left inner and outer extensions 24 and 25. Similarly, the right reinforcing member 44 is a vertically-oriented mounting plate spanning between and interconnecting the distal ends of the right inner and outer extensions 24 and 25. The bumper beam 17 is joined to the distal or front ends of the left and right inner and outer extensions 24 and 25 via the left and right reinforcing members 44.

As noted above, the vehicle body 11 is constructed horizontally (left-right) symmetrically with respect to the longitudinal centerline CL extending in the front-rear direction of the vehicle centrally through the width of the vehicle 10. Thus, because the construction of the left side section of the vehicle body is basically identical to the construction of the right side section of the vehicle body, the following mainly describe the left side section of the vehicle body, omitting description of the construction of the right side section of the vehicle body to avoid unnecessary duplication.

Referring back to FIG. 1, the bumper beam 17 has forwardly-opening bolt holes 17b formed in left and right end portions of a front wall portion thereof located more inwardly, in the vehicle width direction, than the left and right inner extensions 24, so that eyebolts can be screwed into or fastened to the bolt holes 17b when the vehicle is to be towed. Left and right bolt mounting sections 110 are formed at positions corresponding to the bolt holes 17b, details of which will be discussed later.

Figure 20:
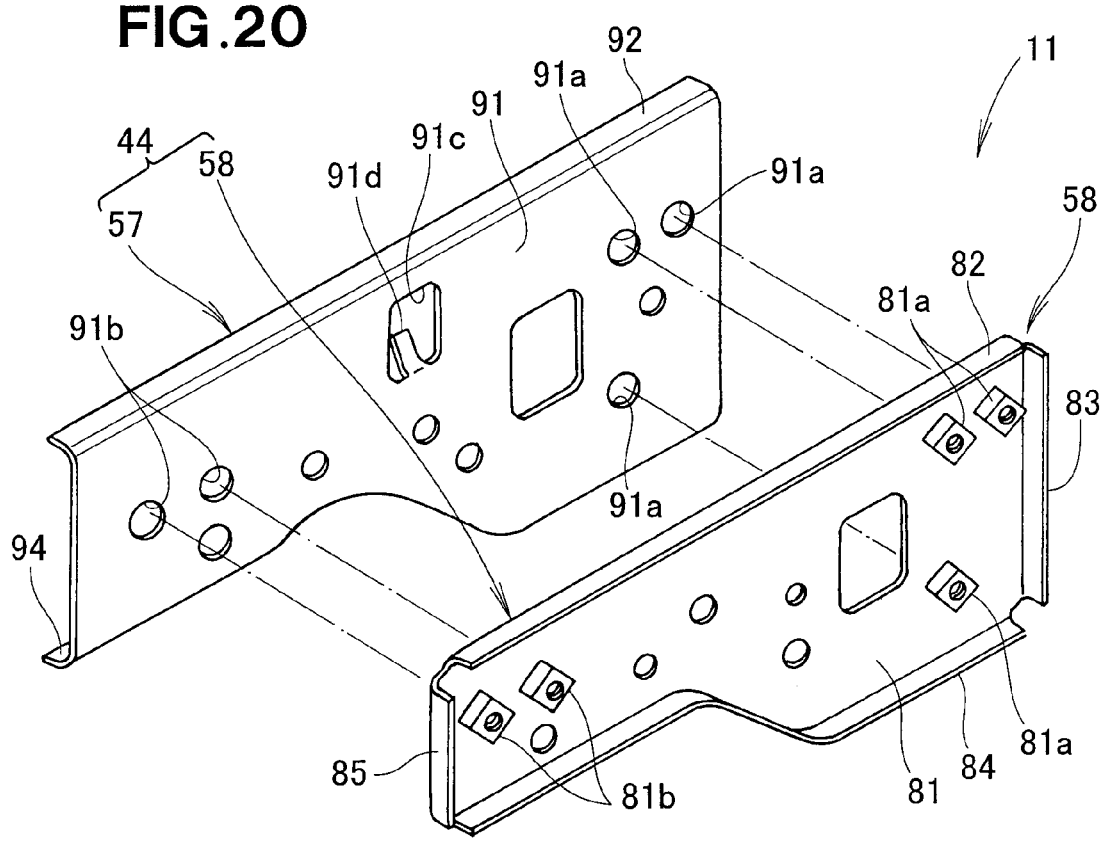
FIG. 20 is an exploded perspective view of the mounting plate of FIG. 4.
Figure 21:
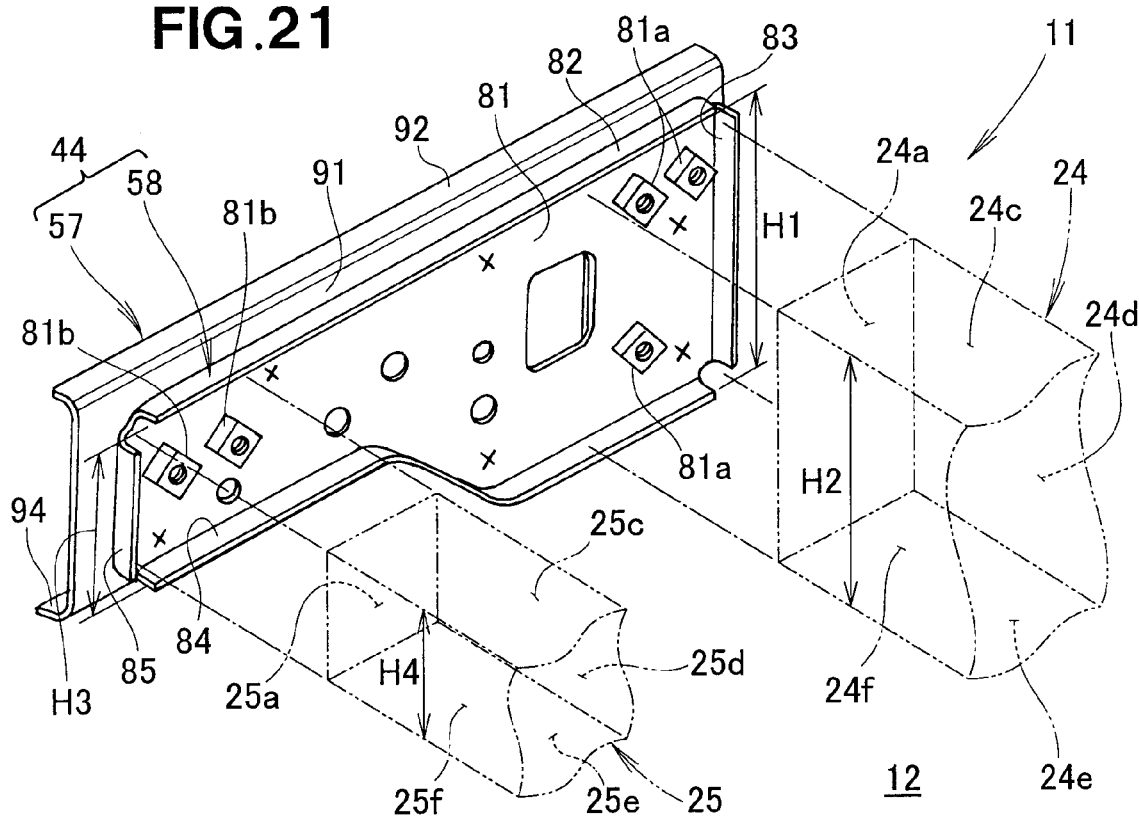
FIG. 21 is a perspective view of the mounting plate of FIG. 20.

The following detail, with reference to FIG. 20 and subsequent figures, the mounting plate 44. As shown in FIGS. 20 and 21, the mounting plate 44 comprises the two separate plates 57 and 58 each having a generally L shape and a generally U cross-sectional shape; thus, the mounting plate 44 can be formed with a predetermined high processing accuracy even in a case where high-tensile or super-high-tensile steel having a tension strength in the order of 980 MPa is used to form the mounting plate 44.

More specifically, the mounting plate 44 comprises the rear plate (rear reinforcing member) 58 to which the inner and outer extensions 24 and 25 are joined, and the front plate (front reinforcing member) 57 which is joined to the rear reinforcing member 58 and to the front surface of which the bumper beam 17 is joined. The front reinforcing member 57 and the rear reinforcing member 58 may be joined together by spot welding.

The rear reinforcing member 58 has: a base (or bottom) plate 81; an upper flange 82 projecting rearward from the upper edge of the base plate 81; a right flange (inner flange) 83 projecting rearward from the right edge of the base plate 81; a lower flange 84 projecting rearward from the lower edge of the base plate 81; and a left flange (outer flange) 85 projecting rearward from the left edge of the base plate 81. Namely, these flanges 82 to 85 are formed along the individual side edges of the base plate 81 in spaced apart relation to one another.

In a part of the base plate 81 to which the inner extension 24 is mounted, a distance H1 from the lower surface of the upper flange 82 to the upper surface of the lower flange 84 is approximate to a height H2 of the inner extension 24 (i.e., H1≈H2) such that the upper surface 24c and lower surface 24e of the inner extension 24 contact the lower surface of the upper flange 82 and the upper surface of the lower flange 84, respectively.

Similarly, in a part of the base plate 81 to which the outer extension 25 is mounted, a distance H3 from the lower surface of the upper flange 82 to the upper surface of the lower flange 84 is approximate to a height H4 of the outer extension 25 (i.e., H3≈H4) such that the upper surface 25c and lower surface 25e of the inner extension 24 contact the lower surface of the upper flange 82 and the upper surface of the lower flange 84, respectively.

Namely, the base plate 81 of the rear reinforcing member 58 has heights different from each other between the part to which the inner extension 24 is mounted and the part to which the outer extension 25 is mounted. More specifically, the base plate 81 has a greater height at the part to which the inner extension 24 is mounted than at the part to which the outer extension 25 is mounted.

The front reinforcing member 57 is slightly larger in size than the rear reinforcing member 58 and has: a base (or bottom) plate 91; an upper flange 92 projecting forward from the upper edge of the base plate 91; and a lower flange 94 projecting forward from the lower edge of the base plate 91.

Further, the base plate 81 of the rear reinforcing member 58 has a plurality of (three in the illustrated example) nuts 81a fixed thereto for fastening the inner extension 24, and a plurality of (two in the illustrated example) nuts 81b fixed thereto for fastening the outer extension 25.

The base plate 91 of the front reinforcing member 57 has a plurality of (three in the illustrated example) holes 91a formed therein for fastening thereto the rear reinforcing member 58 and inner extension 24, and a plurality of (two in the illustrated example) holes 91b formed therein for fastening thereto the rear reinforcing member 58 and outer extension 25. In addition, the front reinforcing member 57 has an opening 91c of a generally rectangular shape formed in a middle portion, in a height direction, of the base plate 91, and an locking claw 91d projecting obliquely upward and forward from a substantially middle part of the lower edge of the opening 91c. Details of the locking claw 91d will be discussed later.

The vehicle body 11 is assembled as follows. First, the front and rear reinforcing members 57 and 58 are joined together by spot welding to make the mounting plate 44. Then, the rear reinforcing member 58 is fitted over the front ends 24a and 25a of the inner and outer extensions 24 and 25, after which the inner and outer extensions 24 and 25 and the flanges 82 to 85 of the rear reinforcing member 58 are MIG-welded.

More specifically, the upper surface 24c, inner side surface 24d and lower surface 24e of the inner extension 24 are welded with the upper flange 82, right flange 83 and lower flange 84, respectively, of the rear reinforcing member 58. Similarly, the upper surface 25c, outer side surface 25f and lower surface 25e of the outer extension 25 are welded with the upper flange 82, left flange 85 and lower flange 84, respectively, of the rear reinforcing member 58. Namely, the outer extension 25 is joined at its three surfaces to the rear reinforcing member 58.

Figure 22:
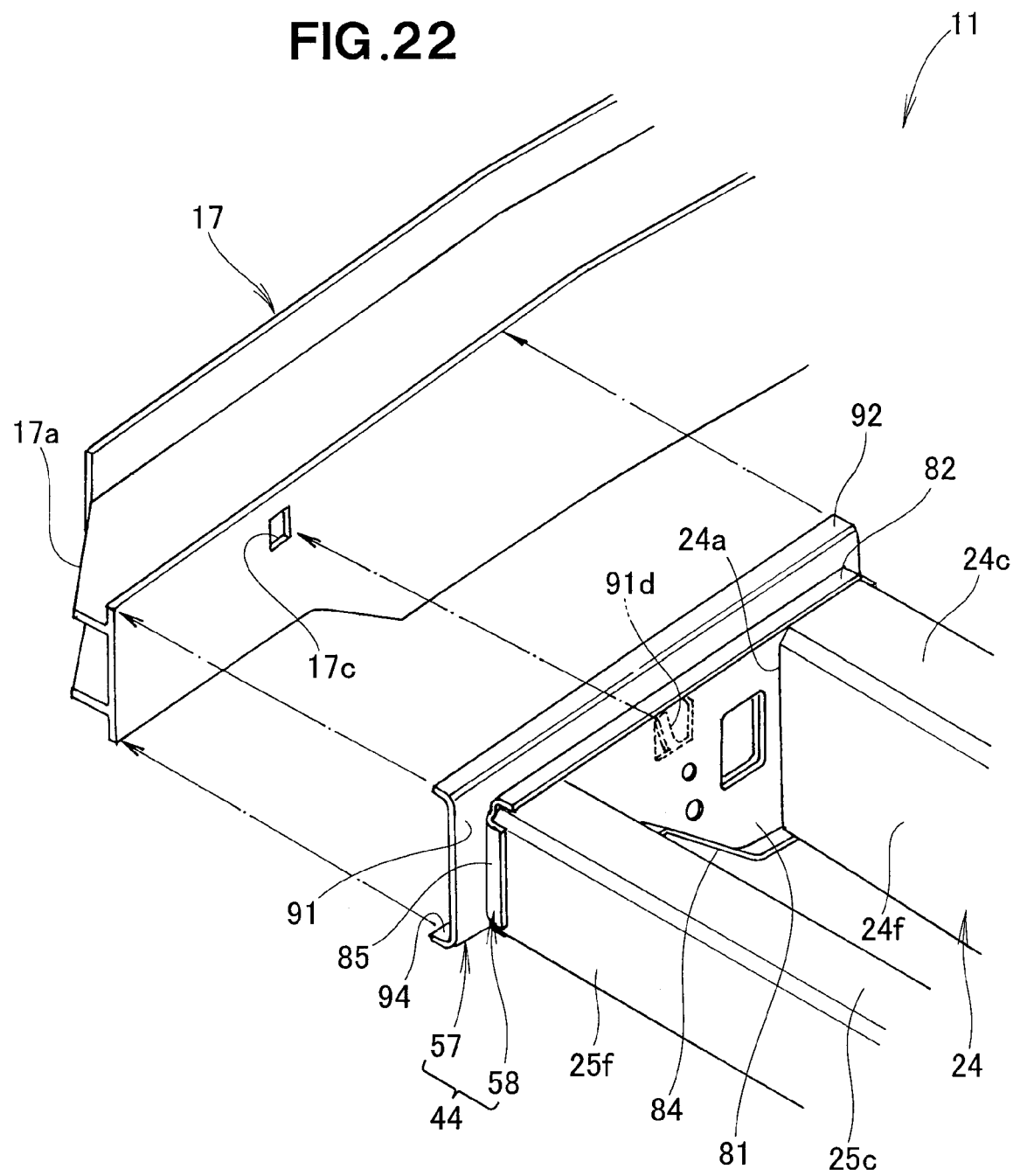
FIG. 22 is a perspective view illustrating a manner in which the mounting plate, extensions and front side frame of FIG. 4 are mounted.
Figure 23:
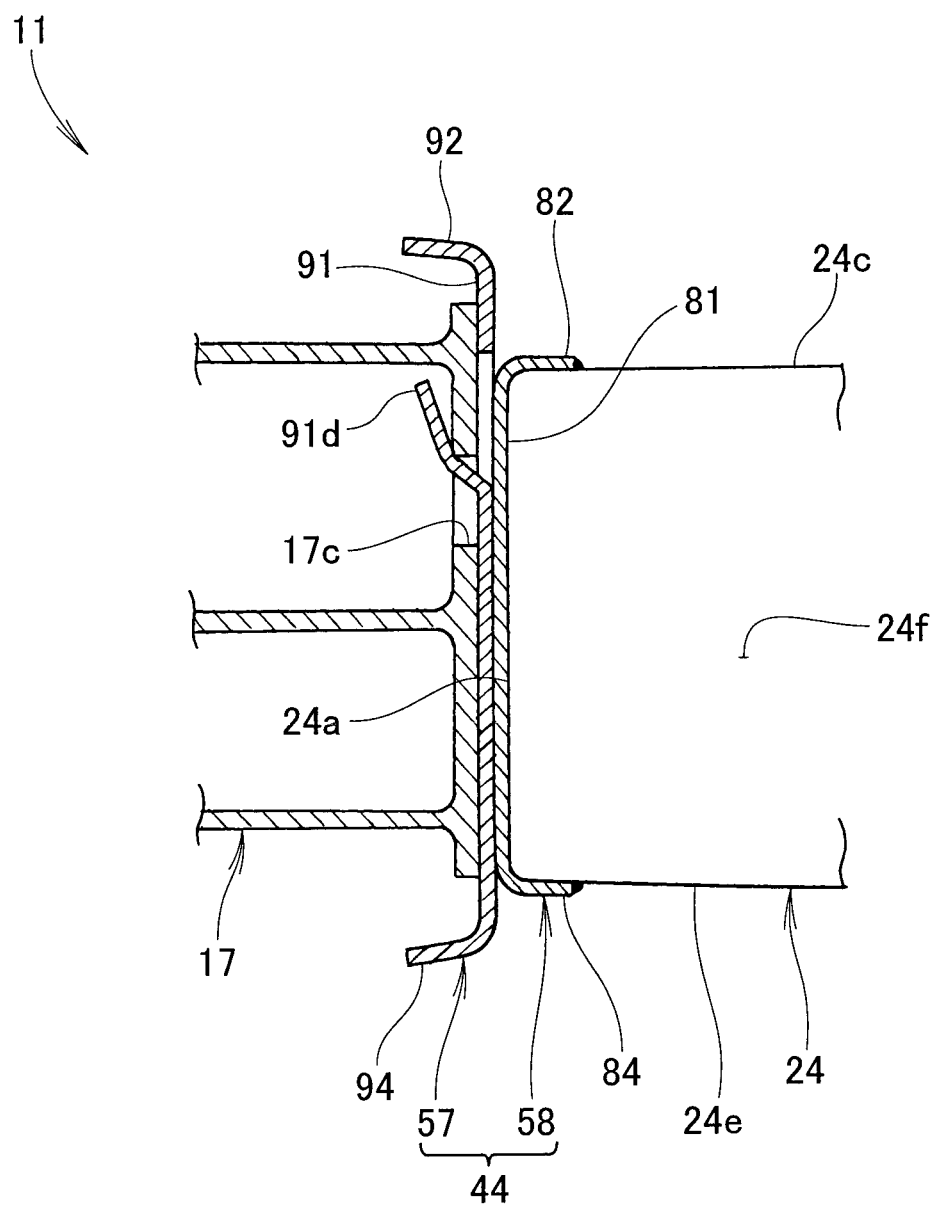
FIG. 23 is a sectional side view showing the bumper beam temporarily joined to the mounting plate of FIG. 22.
Figure 24:
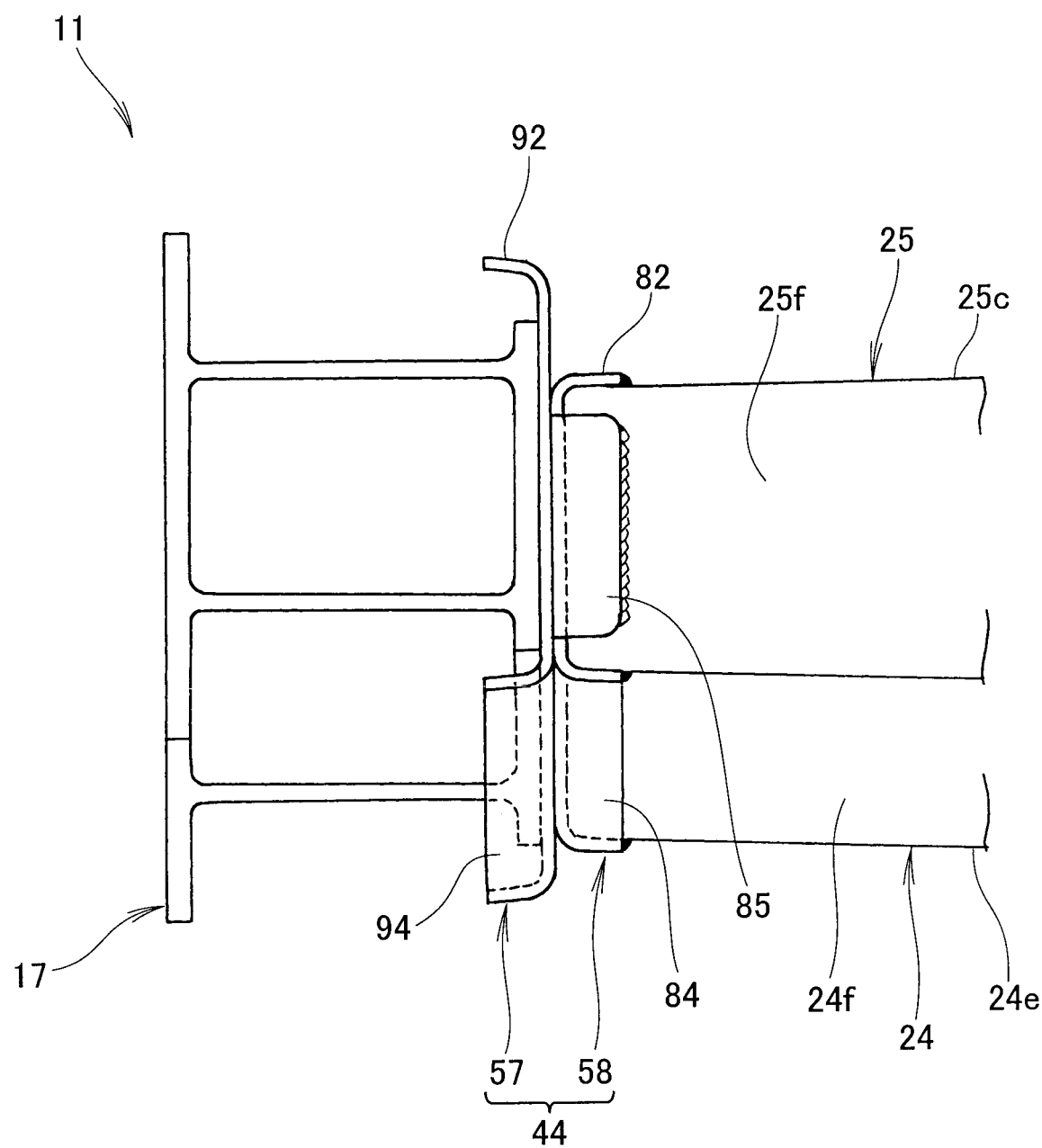
FIG. 24 is a view taken in the direction of arrow 9 of FIG. 4.

As shown in FIGS. 22 and 23, the bumper beam 17 is mounted to the mounting plate 44 after the mounting plate 44 is mounted to the front ends of the inner and outer extensions 24 and 25. For that purpose, the bumper beam 17 has an opening 17c of a substantially rectangular shape formed in a rear wall portion thereof. In mounting the bumper beam 17 to the mounting plate 44, the bumper beam 17 is engaged with the locking claw 91d with the opening 17c fitted over the locking claw 91d; thus, the bumper beam 17 is temporarily joined to the front reinforcing member 57. In this way, it is possible to eliminate a need for keeping on holding the bumper beam 17 during mounting of the bumper beam 17 and thereby facilitate the assembly work. Then, the bumper beam 17 is ultimately joined to the mounting plate 44 as shown in FIG. 24 with the opening 17c still fitted over the locking claw 91d. Details of the bolt mounting section 110 will be discussed below with reference to FIG. 25 and subsequent figure.

Figure 25:
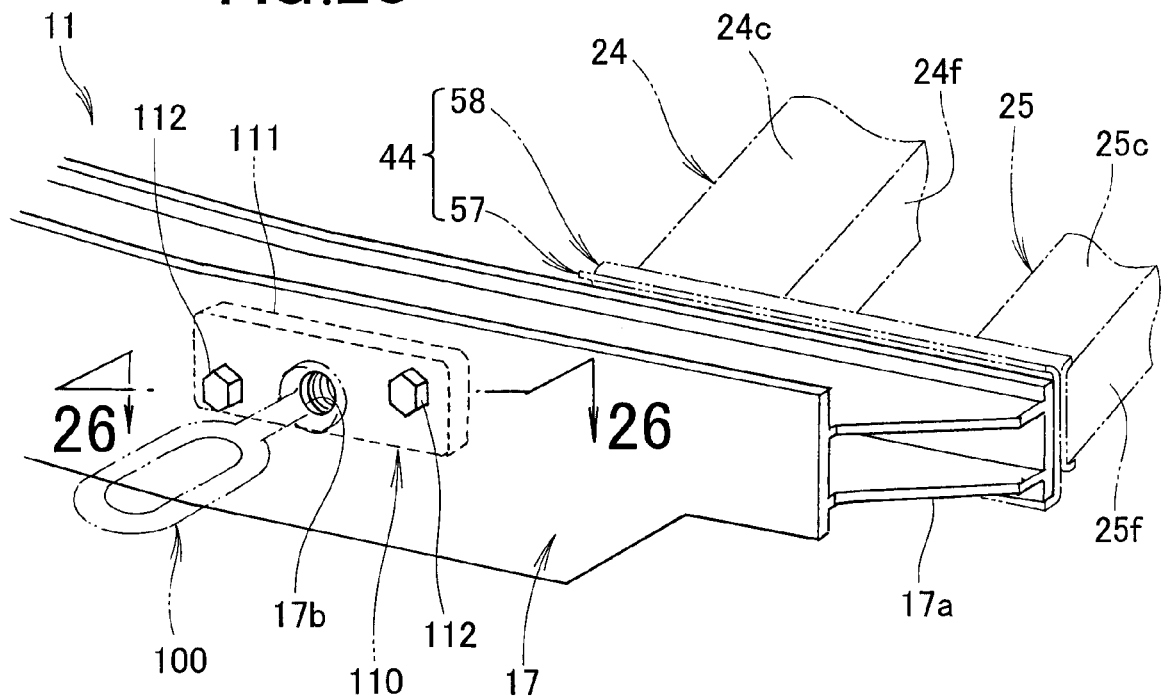
FIG. 25 is a perspective view illustrating how an eyebolt is fastened to the bumper beam o FIG. 4.
Figure 26:
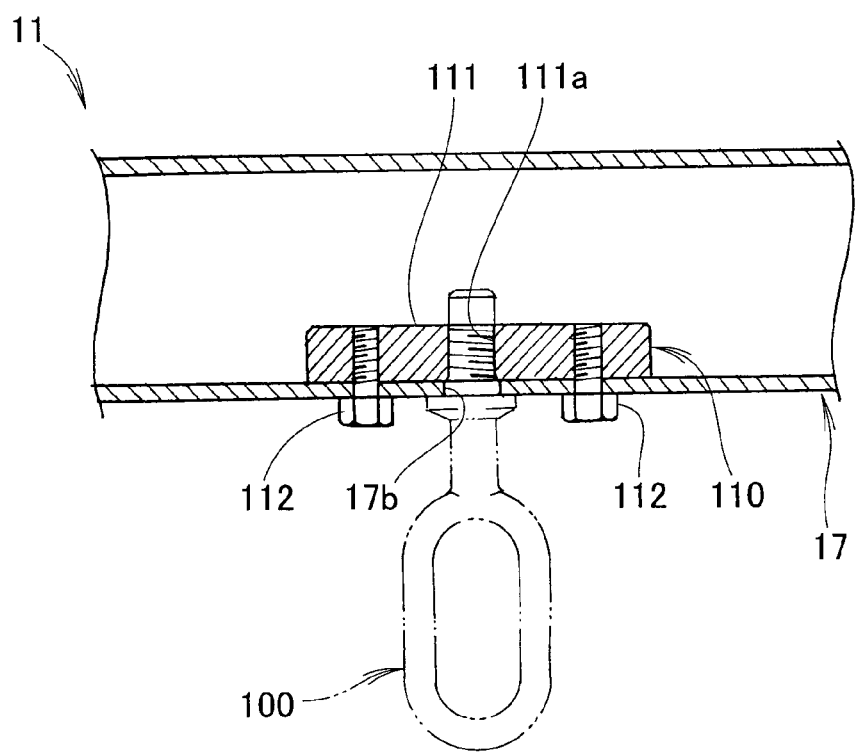
FIG. 26 is a sectional view taken along line 26-26 of FIG. 25.

As shown in FIGS. 25 and 26, the bolt mounting section 110 is provided on the front wall portion of the bumper beam 17 for fastening thereto the eyebolt 100. The bolt mounting section 110 is provided more inwardly, in the vehicle width direction, than the inner extension 24 and mounting plate 44. The bolt mounting section 110 includes a bolt mounting plate 111 of a substantially rectangular shape fixedly fastened to the bumper beam 17 by means of two bolts 112. The bolt mounting plate 111 has a bolt mounting hole 11a formed centrally therein for fastening thereto the eyebolt 100. Namely, the bolt mounting plate 111 is a section to be towed via the eyebolt 100.

The above-described embodiment can achieve the following advantageous benefits.

As shown in FIGS. 4 and 8, the embodiment of the front vehicle body structure of the present invention includes the front side frame 15 extending in the front-rear direction of the vehicle body, and the gusset 31 disposed laterally outward (i.e., outward in the vehicle width direction) of the front side frame 15 and functioning to transmit a frontal collision load to the front side frame 15 when the frontal collision load has acted on a portion of the vehicle located laterally outward of the front side frame 15. With such a gusset 31 disposed laterally outward (i.e., outward in the vehicle width direction) of the front side frame 15 and functioning to transmit a frontal collision load to the front side frame 15 when the frontal collision load has acted on a portion of the vehicle located laterally outward of the front side frame 15, energy of the frontal collision load can be absorbed by bending of the front side frame 15 after the frontal collision load is received by the gusset 31. As a result, the embodiment of the front vehicle body structure can achieve an increased capability for absorbing an impact of the frontal collision load caused by the narrow offset collision.

Further, the gusset 31 is disposed spaced in the rearward direction of the vehicle body from the distal end 15a of the front side frame 15 by a predetermined distance, and the tension member 32 extends between and interconnects the distal end 15a of the front side frame 15 and the outer end portion 31a of the gusset 31 for preventing the gusset 31 from peeling off the front side frame 15. Thus, when a narrow offset collision has occurred, the embodiment of the front vehicle body structure can prevent the gusset 31 from peeling off the front side frame 15. As a result, the tension member 32 can prevent the gusset 31 from peeling off the front side frame 15 against a frontal collision load having acted on a portion of the vehicle located laterally outward of the front side frame 15 at the time of occurrence of the narrow offset collision, and impact energy of the frontal collision load can be absorbed by the gusset 31 bending the front side frame 15.

Further, as shown in FIG. 4, the embodiment of the front vehicle body structure of the present invention includes the gusset joint section 35 having a high strength with the gusset (lower member connection member) 31 joined thereto, and the engine mount section 37 having a high strength for mounting thereon the engine 36 behind (at a position rearward of) the gusset joint section 35. Namely, the gusset joint section 35 and the engine mount section 37 are each a high-strength component part.

Thus, in the embodiment of the front vehicle body structure, the bending point section 38 of a low strength is provided between the high-strength gusset joint section 35 and the high-strength engine mount section 37 such that the front side frame 15 bends at the bending point section 38 when a frontal collision load has acted on the front side frame 15. With such an arrangement, there is no need to add a particular shape, such as a recessed shape, a particular reinforcing member, etc. to the front side frame 15, and thus, the front side frame 15 and hence the front vehicle body structure can be manufactured or made with ease and with an increased yield rate. Such an arrangement can also achieve a reduced weight of the vehicle body 11.

Further, in the embodiment of the front vehicle body structure, as shown in FIGS. 15 and 18B, the gusset 31 functions also as the lower member connection member 31 interconnecting the front side frame 15 and the lower member 22 disposed along the front side frame 15. The lower member connection member 31 is disposed to define an L shape in conjunction with the front part 15b of the front side frame 15 as viewed in plan, and the front wall of the lower member connection member 31 is located at generally the same position, in the front-rear direction of the vehicle body, as the distal end 22a of the lower member 22.

Furthermore, the inner bumper beam extension 24 that absorbs a frontal collision load is provided at the distal end 15a of the front side frame 15 while the outer bumper beam extension 25 that absorbs a frontal collision load is provided at the distal end 22a of the lower member 22, and the length of the outer bumper beam extension 25 is greater than the length of the inner bumper beam extension 24. Thus, when a light narrow offset collision involving a small collision load, the outer bumper beam extension 25 is allowed to have a sufficient impact absorbing stroke, which can effectively suppress breakage of the lower member 22. As a result, the vehicle can be repaired by replacement of the outer bumper beam extension 25 alone, which is very cost efficient.

Furthermore, because the inner bumper beam extension 24 and the outer bumper beam extension 25 are integrated at their respective front ends 24a and 25a by means of the reinforcing member 44 as shown in FIG. 12, the inner bumper beam extension 24 can buckle together with the outer bumper beam extension 25 at the time of occurrence of a narrow offset collision. With such an arrangement, the embodiment of the front vehicle body structure can efficiently absorb an impact of a frontal collision load.

Figure 14:
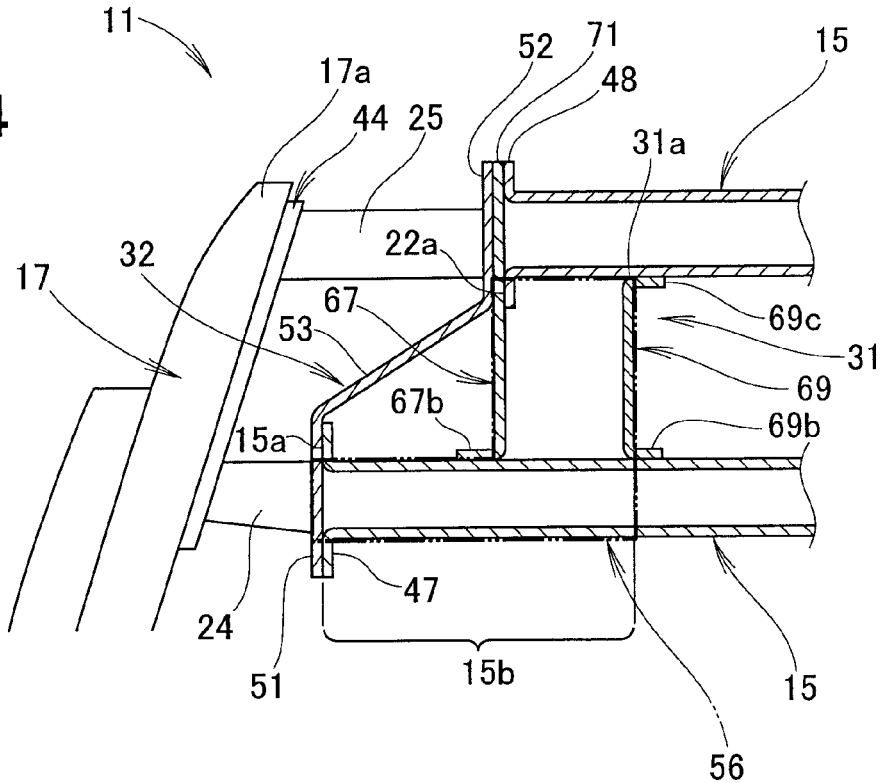
FIG. 14 is a view explanatory of a generally-trapezoid-shaped structure provided in the embodiment of the front vehicle body structure of FIG. 1.

Furthermore, in the embodiment of the front vehicle body structure, as shown in FIG. 14, the tension member 32, which is in the form of a steel plate, constitutes the generally-trapezoid-shaped structure 54 in conjunction with the lower member connection member 31 and the front part 15b of the front side frame 15, and the triangular hollow structure section 55 is formed in front of the generally-trapezoid-shaped structure 54. Thus, at the time of occurrence of a narrow offset collision, the triangular hollow structure section 55 can function as an impact absorbing area. Further, when a frontal collision load acts on the lower member connection member 31 at the time of the narrow offset collision, the tension member 32 can keep the lower member connection member 31 pulled and connected to the distal end 15a of the front side frame 15. Namely, the tension member 32 can provide a sufficient tension action to the lower member connection member 31 and thereby prevent peeling-off of the lower member connection member 31.

Furthermore, as shown in FIG. 1, the embodiment of the front vehicle body structure includes the bumper beam 17 disposed in front of the front side frame 15 and extending in the vehicle width direction laterally beyond the front end of the front side frame 15. The left and right outer bumper beam extensions 25 are joined with the opposite end portions 17a of the bumper beam 17, as a result of which the embodiment of the front vehicle body structure can achieve an increased capability for absorbing an impact of the frontal collision load caused by the narrow offset collision.

Furthermore, in the embodiment of the front vehicle body structure, as shown in FIG. 11, the tension member 32 functions also as the mounting plate member for joining together the inner and outer bumper beam extensions 24 and 25. Such an arrangement can simplify the construction of the front vehicle body section and reduce the number of necessary component parts of the front vehicle body section.

Furthermore, in the embodiment of the front vehicle body structure, as shown in FIGS. 9 and 14, the lower member connection member 31 includes the front wall extension 71 provided on the front wall thereof and extending outward in the vehicle width direction, and the front wall extension 71 is sandwiched between the tension member 32 and the distal end 22a of the lower member 22. Thus, when a narrow offset collision has occurred so that a frontal collision load acts on the lower member connection member 31, the lower member connection member 31 is pulled in the forward direction of the vehicle body against the frontal collision so that it can be kept connected to the front side frame.

Figure 27A:
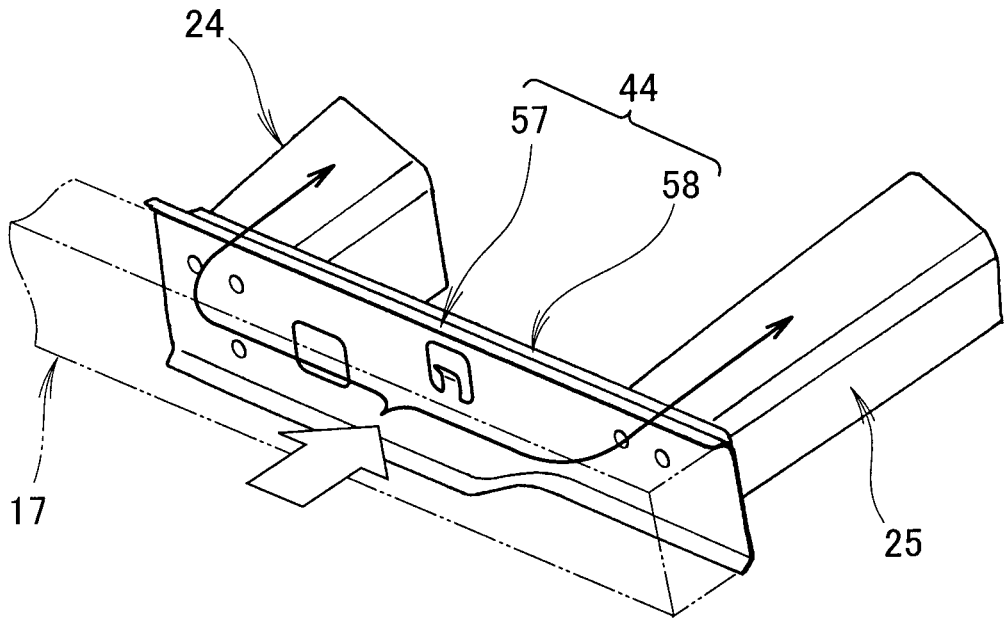
FIGS. 27A and 27B are perspective views illustrating a behavior of the mounting plate of FIG. 19.

Further, at the time of occurrence of a narrow offset collision where a frontal collision load (i.e., impact load applied from the front of the vehicle) acts on a narrow range of an outer end portion, in the vehicle width direction, of the front section of the vehicle (e.g., an outer end portion 17a, in the vehicle width direction, of the bumper beam 17) as indicated by a white arrow in FIG. 27A, the above-described embodiment, where the left and right mounting plates 44 each interconnect the front ends 24a and 25a of the corresponding inner and outer extensions 24 and 25, can prevent the frontal collision load from adversely influencing the front-to-rear impact absorbing performance of the inner and outer extensions 24 and 25.

Figure 27B:
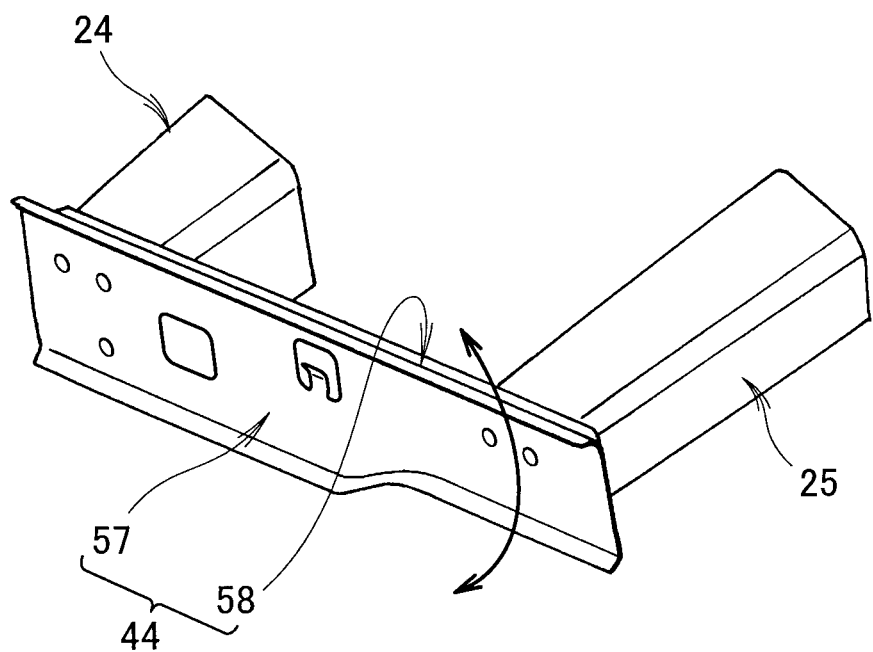

A twisting load may act on the outer extension 25 as indicated by a double-headed arrow in FIG. 27B. However, in the above-described embodiment where the front ends 24a and 25a of the inner and outer extensions 24 and 25 are interconnected by the mounting plate 44, the inner extension 24 and the mounting plate 44 can suppress undesired twist of the outer extension 25. Namely, the above-described embodiment can increase rigidity, particularly twisting rigidity, of an outer end section of the front section of the vehicle body. As a result, the above-described embodiment can increase the steering stability of the vehicle while securing a sufficient front-to-rear impact absorbing performance against a narrow offset collision.

Further, the front and rear reinforcing members 57 and 58, superposed on each other in the front-rear direction of the vehicle body to constitute the mounting plate 44, have the upper flanges 82 and 92 projecting in opposite front-rear directions (i.e., rearward and forward) from their respective upper edges and have the lower flanges 84 and 94 projecting in the opposite front-rear directions (i.e., rearward and forward) from their respective lower edges, as shown in FIGS. 20 and 21. By the front and rear reinforcing members 57 and 58 being joined together superposed on each other in the front-rear direction of the vehicle body and by the flanges 82, 84, 92 and 94 projecting in the opposite directions (i.e., away from each other in the front-rear direction) from the upper and lower edges of the front and rear reinforcing members 57 and 58, the above-described embodiment can even further increase rigidity, particularly twisting rigidity, of the front end sections of the vehicle body.

In addition, because the inner extension 24 is joined at three surfaces, i.e. upper surface 24c, inner side surface 24d and lower surface 24e, to the flanges 82 to 84 of the rear reinforcing member 58, the above-described embodiment can even further increase the twisting rigidity. Similarly, because the outer extension 25 is joined at three surfaces, i.e. upper surface 25c, outer side surface 25f and lower surface 25e, to the flanges 82 to 84 of the rear reinforcing member 58, the above-described embodiment can even further increase the twisting rigidity.

Furthermore, the bolt mounting section 110 is provided more inwardly, in the vehicle width direction, than the high-rigidity mounting plate 44, as shown in FIGS. 25 and 26. When the vehicle is towed with the eyebolt 100 fastened to the bolt mounting section 110, reactive force against the towing would act on the bumper beam 17. The reactive force having acted on the bumper beam 17 is transmitted via the mounting plate 44 to the inner and outer extensions 24 and 25. Because the mounting plate 44 has a high rigidity, it can reliably disperse the towing load to a greater range, the above-described embodiment can minimize deformation of the bumper beam 17 etc. during the towing.

Whereas the embodiment of the front vehicle body structure of the present invention has been described above in relation to the case where the tension member 32 functions also as the mounting plate member for joining together the inner and outer bumper beam extensions 24 and 25 as shown in FIG. 12, such a tension member 32 and a mounting plate member may be separate component parts.

Further, whereas the embodiment of the front vehicle body structure of the present invention has been described above in relation to the case where the generally-trapezoid-shaped structure 54 is constructed of the tension member 32, lower member connection member 31 and front part 15b of the front side frame 15 as shown in FIG. 14, the generally-trapezoid-shaped structure 54 may include a joint section between the lower member 22 and the tension member 32.

Whereas the front vehicle body structure of the present invention has been described above as applied to a passenger vehicle, it is of course applicable to vehicles of any other types.

However, the front vehicle body structure of the present invention is particularly suited to application to passenger vehicles, such as sedans and wagons.

What is claimed is:

1. A front vehicle body structure comprising, on each of left and right sides of a vehicle body:
   a front side frame extending in a front-rear direction of the vehicle body;
   a gusset disposed outward, in a vehicle width direction, of the front side frame, the gusset transmitting a frontal collision load to the front side frame when the frontal collision load has acted on a portion of the vehicle located outward, in the vehicle width direction, of the front side frame, the gusset being offset in a rearward direction of the vehicle body from a distal end of the front side frame by a predetermined distance; and
   a tension member extending between and interconnecting the distal end of the front side frame and an outer end portion, in the vehicle width direction, of the gusset, the tension member preventing the gusset from peeling off the front side frame,
   wherein the front side frame includes a gusset joint section, an engine mount section and a bending section disposed between the gusset joint section and the engine mount section,
   the gusset joint section having a high strength by having the gusset joined thereto,
   the engine mount section having a high strength for mounting an engine thereon at a position rearward of the gusset joint section,
   and the front side frame configured to bend at the bending section when the frontal collision load has acted on the front side frame.

2. The front vehicle body structure according to claim 1, wherein the gusset is a lower member connection member interconnecting the front side frame and a lower member disposed along the front side frame,
   wherein, as viewed in plan, the lower member connection member defines an L shape portion in conjunction with a front part of the front side frame, and the lower member connection member has a front wall located at generally a same position, in the front-rear direction of the vehicle body, as a distal end of the lower member, and
   which further comprises an inner bumper beam extension provided at the distal end of the front side frame for absorbing a frontal collision load, and an outer bumper beam extension provided at the distal end of the lower member for absorbing a frontal collision load, the outer bumper beam extension having a greater length than the inner bumper beam extension.

3. The front vehicle body structure according to claim 2, wherein the inner bumper beam extension and the outer bumper beam extension are joined together by being interconnected at respective front ends thereof via a reinforcing member.

4. A front vehicle body structure comprising, on each of left and right sides of a vehicle body:
   a front side frame extending in a front-rear direction of the vehicle body;
   a gusset disposed outward, in a vehicle width direction, of the front side frame, the gusset transmitting a frontal collision load to the front side frame when the frontal collision load has acted on a portion of the vehicle located outward, in the vehicle width direction, of the front side frame, the gusset being offset in a rearward direction of the vehicle body from a distal end of the front side frame by a predetermined distance; and
   a tension member extending between and interconnecting the distal end of the front side frame and an outer end portion, in the vehicle width direction, of the gusset, the tension member preventing the gusset from peeling off the front side frame,
   wherein the tension member is in a form of a steel plate, and constitutes a generally-trapezoid-shaped structure in conjunction with the lower member connection member and the front part of the front side frame, and a triangular hollow structure section is provided in front of the generally-trapezoid-shaped structure.

5. The front vehicle body structure according to claim 2, which further comprises a bumper beam disposed in front of the front side frames on the left and right sides of the vehicle body and extending in the vehicle width direction beyond the front side frames, the bumper beams being joined at opposite outer end portions thereof to the outer bumper beam extensions on the left and right sides of the vehicle body.

6. The front vehicle body structure according to claim 2, wherein the tension member functions also as a mounting plate member for mounting the inner and outer bumper extensions.

7. The front vehicle body structure according to claim 2, wherein the lower member connection member has a front wall extension provided on the front wall of the lower member connection member and extending outward in the vehicle width direction, and the front wall extension is sandwiched between the tension member and a distal end of the lower member.

8. The front vehicle body structure according to claim 1, which further comprises on each of the left and right sides thereof:
- an upper member disposed upward and outward, in the vehicle width direction, of the front side frame, the upper member extending obliquely forward and downward from a front pillar;
- an inner bumper beam extension extending forward from a front end of the front side frame;
- an outer bumper beam extension extending forward from a front end of the upper member;
- a mounting plate spanning between respective front ends of the inner and outer bumper beam extensions; and
- a bumper beam extending in the vehicle width direction to be joined to the mounting plates provided on the left and right sides of the vehicle body.

9. The front vehicle body structure according to claim 8, wherein the mounting plate comprises at least a pair of front and rear reinforcing members joined together superposed on each other in the front-rear direction of the vehicle body, and
the front and rear reinforcing members of the mounting plate have upper flanges projecting from respective upper edges thereof in opposite front-rear directions of the vehicle body and lower flanges projecting from respective lower edges thereof in the opposite front-rear directions of the vehicle body.

10. The front vehicle body structure according to claim 8, wherein each of the left and right mounting plates comprises at least a pair of front and rear reinforcing members joined together superposed on each other in the front-rear direction of the vehicle body, the front reinforcing member of the mounting plate having a locking claw projecting forward therefrom, and
the bumper beam has left and right openings engageable with the locking claws of the mounting plates on the left and right sides of the vehicle body.

11. The front vehicle body structure according to claim 8, wherein the bumper beam has left and right bolt mounting sections located more inwardly, in the vehicle width direction, than the inner bumper beam extensions on the left and right sides of the vehicle body for fastening thereto left and right eyebolts, the left and right bolt mounting sections are sections configured to be towed via the left and right eyebolts.

12. The front vehicle body structure according to claim 1, wherein the gusset includes a front end portion which fits nestingly between the tension member and the front side frame.

13. A front vehicle body structure comprising, on each of left and right sides of a vehicle body:
- a front side frame extending in a front-rear direction of the vehicle body;
- an upper member disposed above the front side frame and outward, in the vehicle width direction, of the front side frame;
- a lower member affixed to, and extending forward and downward from the upper member;
- a gusset attached to the front side frame and extending outwardly, in a vehicle width direction, from the front side frame, the gusset configured to transmit a frontal collision load to the front side frame when the frontal collision load has acted on a portion of the vehicle located outward, in the vehicle width direction, of the front side frame, the gusset being offset in a rearward direction of the vehicle body from a distal end of the front side frame by a predetermined distance; and
- a tension member extending between and interconnecting the distal end of the front side frame and an outer end portion, in the vehicle width direction, of the gusset, the tension member configured and arranged to retain the gusset in contact with the front side frame;
- wherein the gusset, the tension member and the lower member all interconnect at a connection area located at a forward end of the lower member.

14. The front vehicle structure according claim 13, wherein the gusset includes a front end portion which fits nestingly between the tension member and the front side frame.

* * * * *